Sept. 27, 1932.  B. C. KENYON ET AL  1,879,693
AUTOMATIC SOUND REPRODUCING INSTRUMENT
Filed July 15, 1927  18 Sheets-Sheet 1
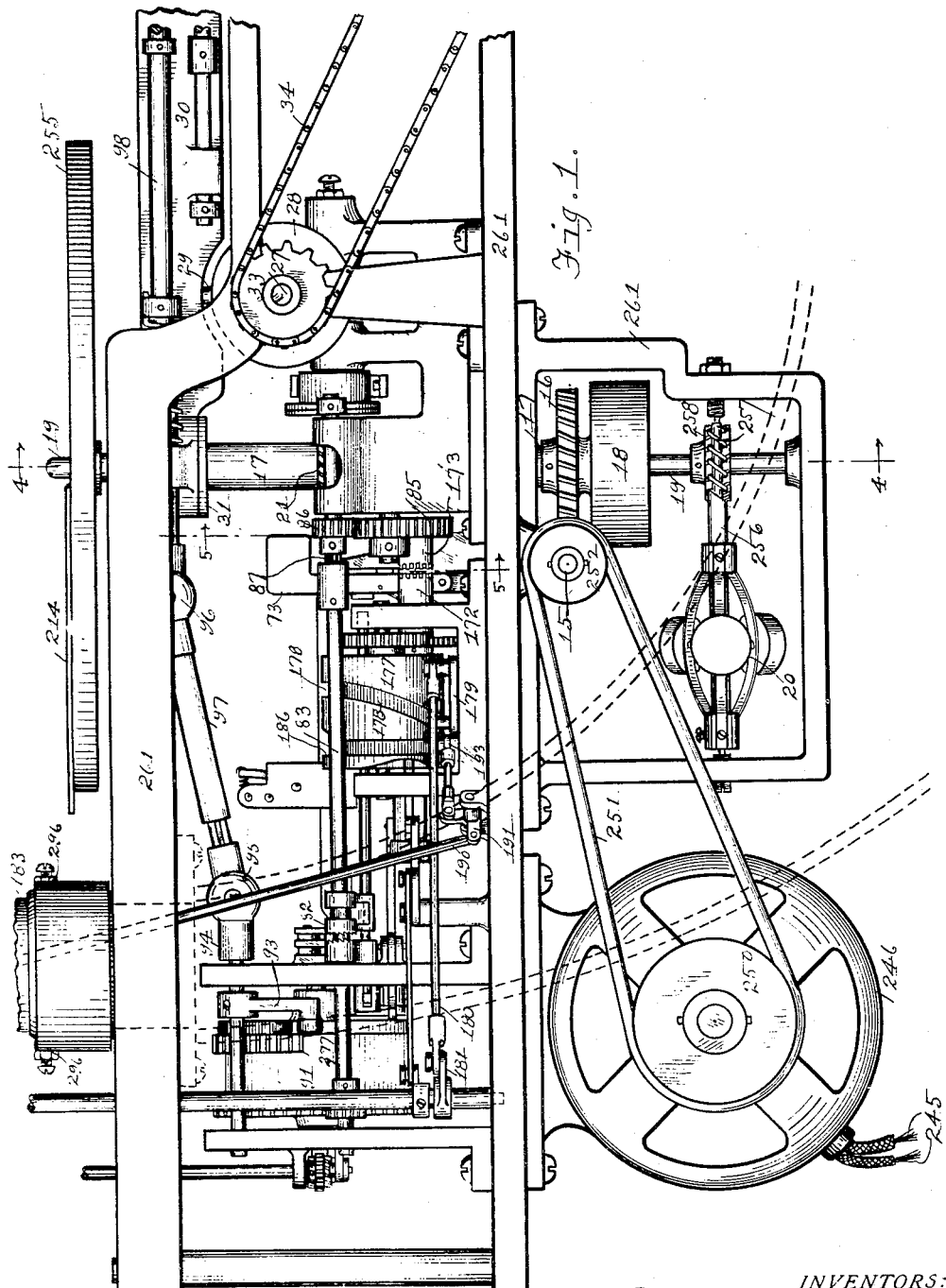
INVENTORS:
Wilmur W. Boa
Clifford H. Green
Bertram C. Kenyon
Cyrus W. Rice
ATTORNEY
Witness

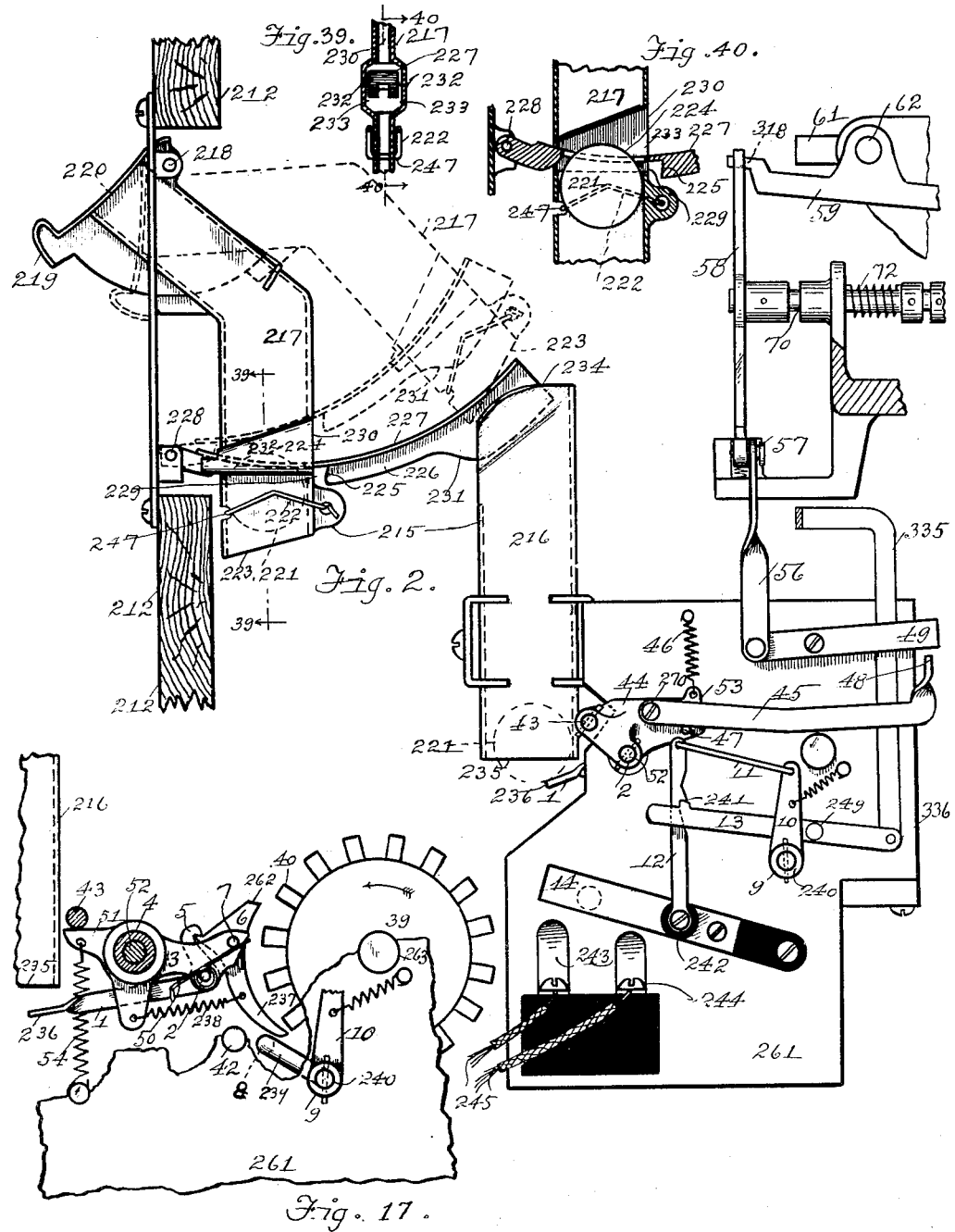

Sept. 27, 1932.  B. C. KENYON ET AL  1,879,693
AUTOMATIC SOUND REPRODUCING INSTRUMENT
Filed July 15, 1927   18 Sheets-Sheet 3
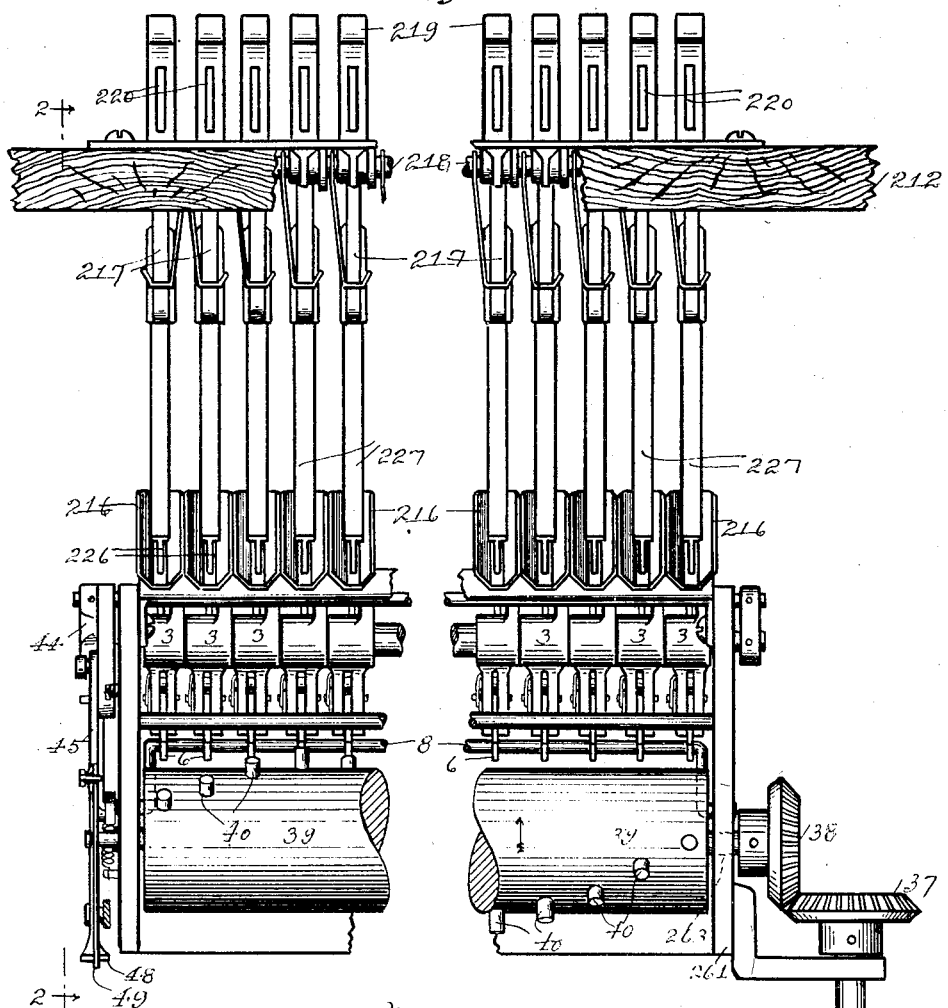
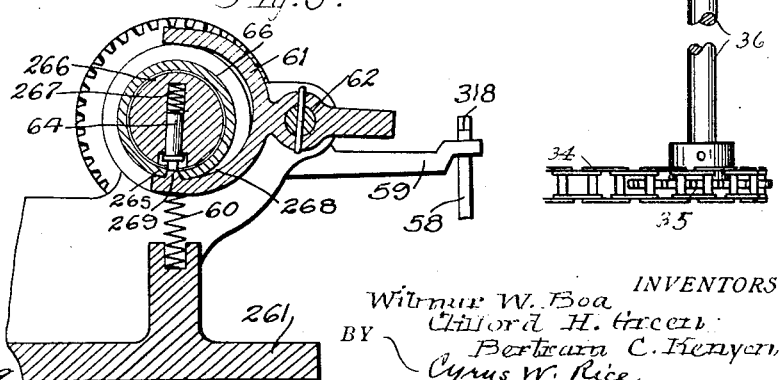

Sept. 27, 1932. B. C. KENYON ET AL 1,879,693
AUTOMATIC SOUND REPRODUCING INSTRUMENT
Filed July 15, 1927   18 Sheets-Sheet 4

INVENTORS:
Wilbur W. Boa
Clifford H. Green
Bertram C. Kenyon
BY Cyrus W. Rice
ATTORNEYS.

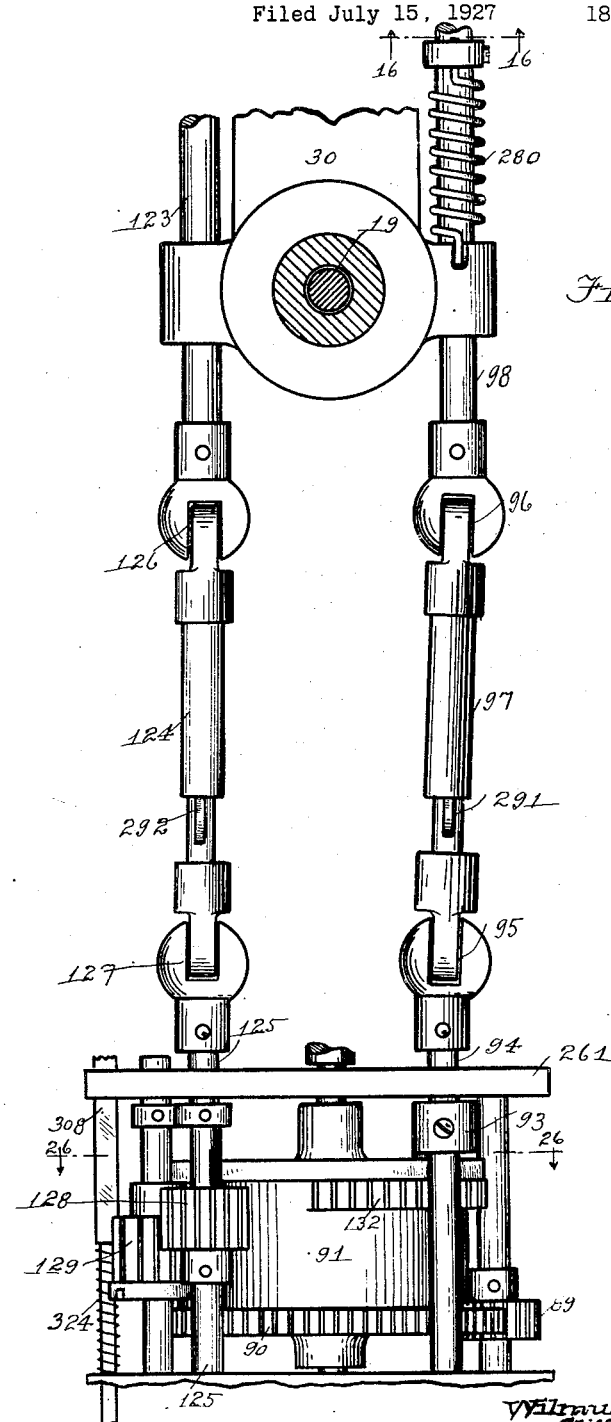

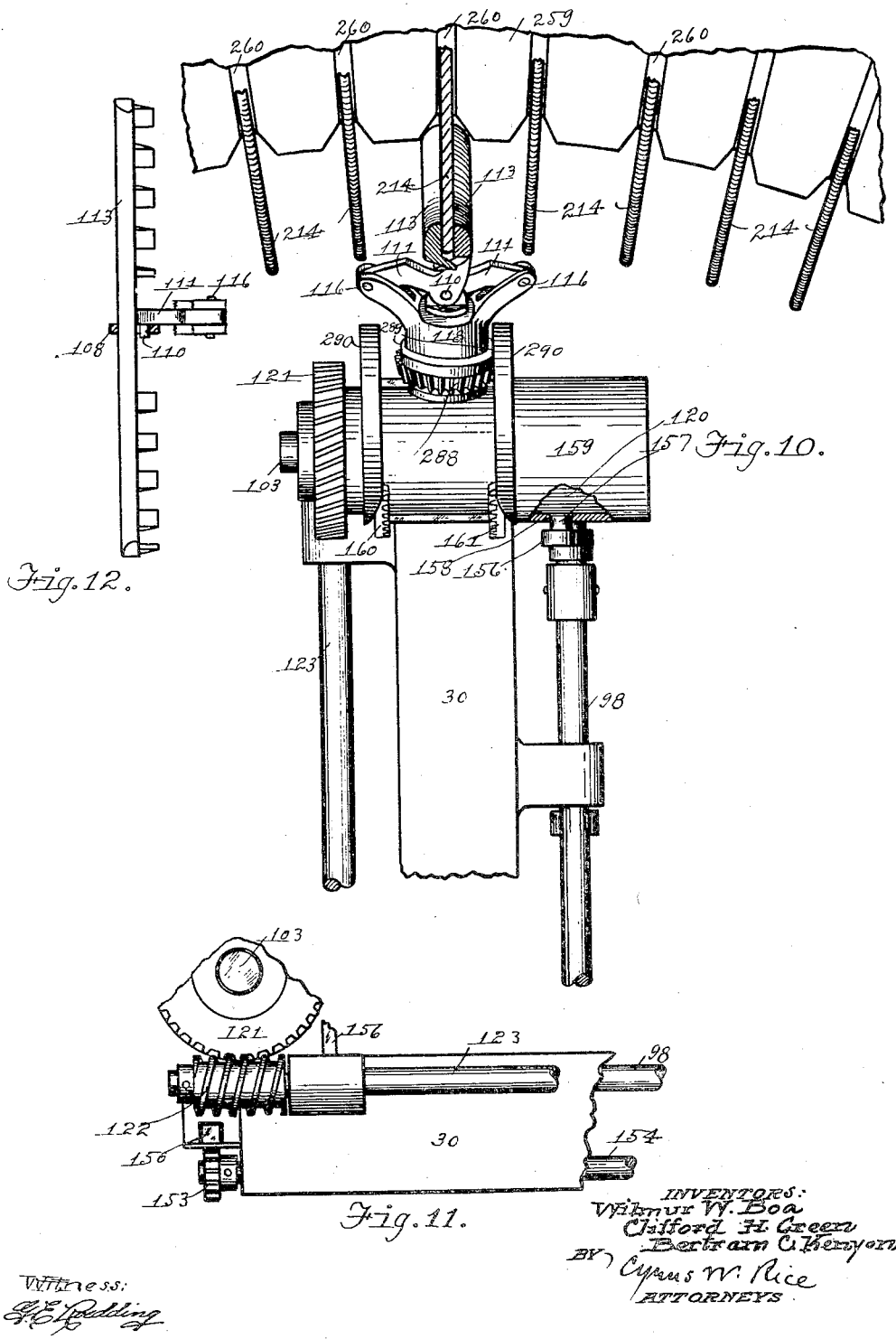

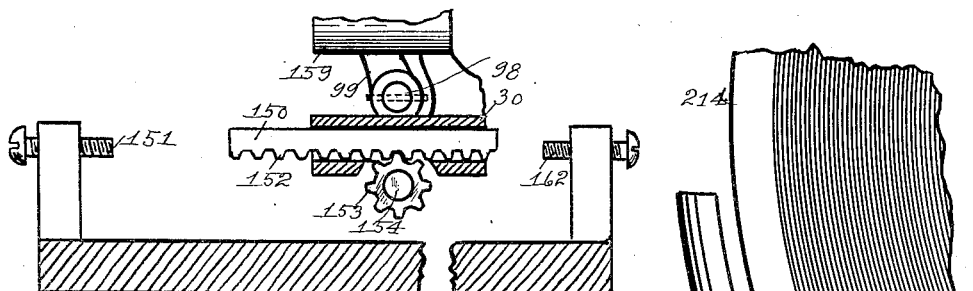
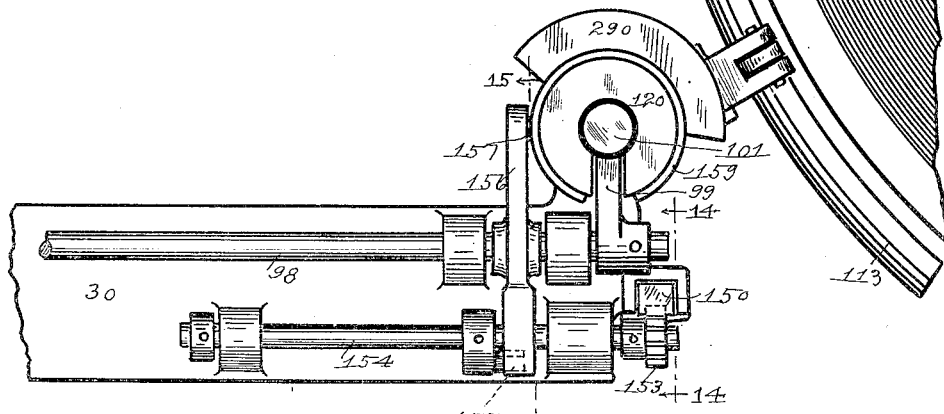
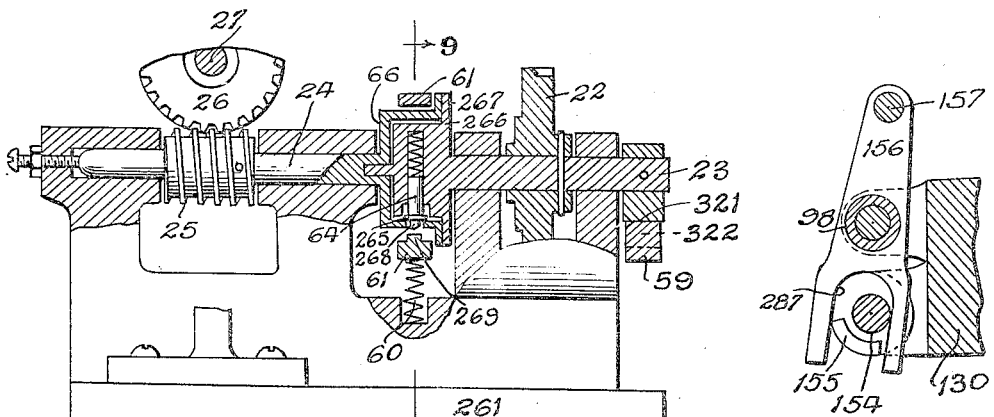

Sept. 27, 1932.   B. C. KENYON ET AL   1,879,693
AUTOMATIC SOUND REPRODUCING INSTRUMENT
Filed July 15, 1927    18 Sheets-Sheet 9

Sept. 27, 1932.　　　B. C. KENYON ET AL　　　1,879,693
AUTOMATIC SOUND REPRODUCING INSTRUMENT
Filed July 15, 1927　　　18 Sheets-Sheet 10

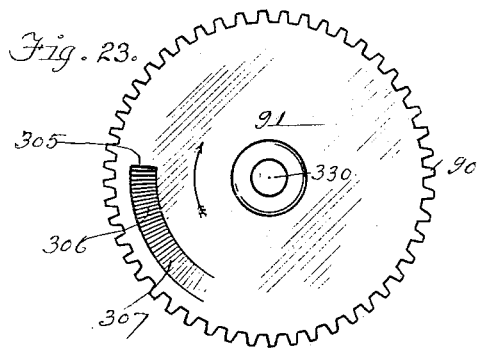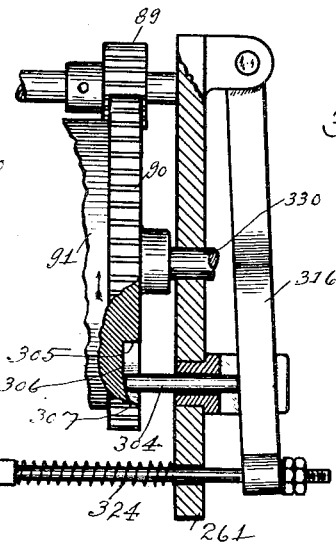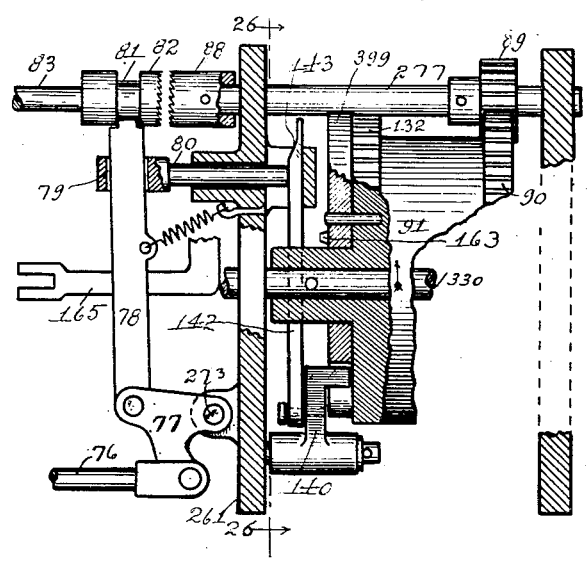

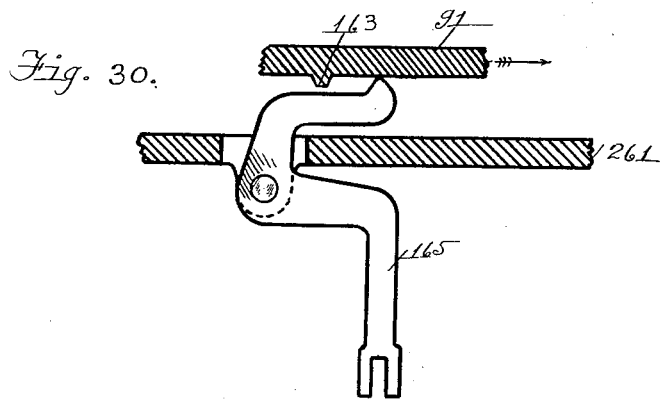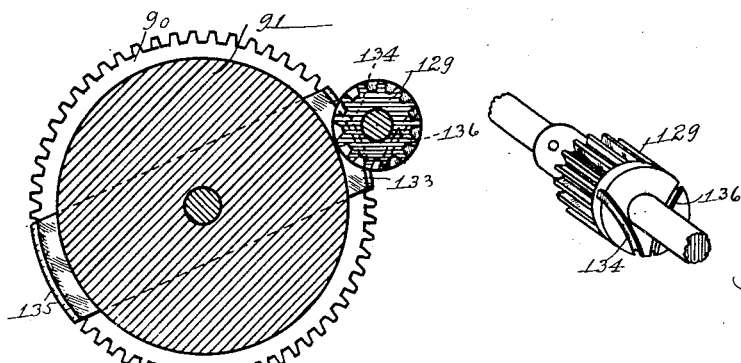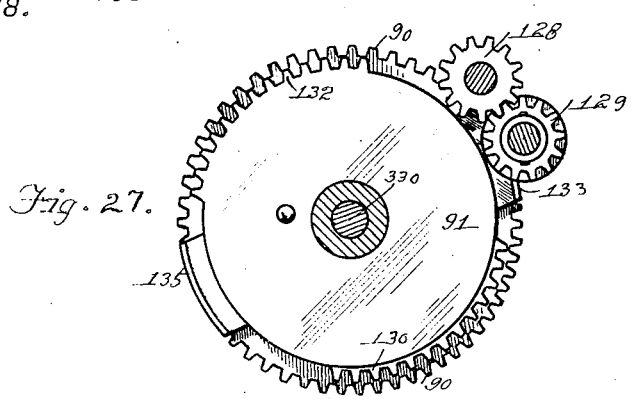

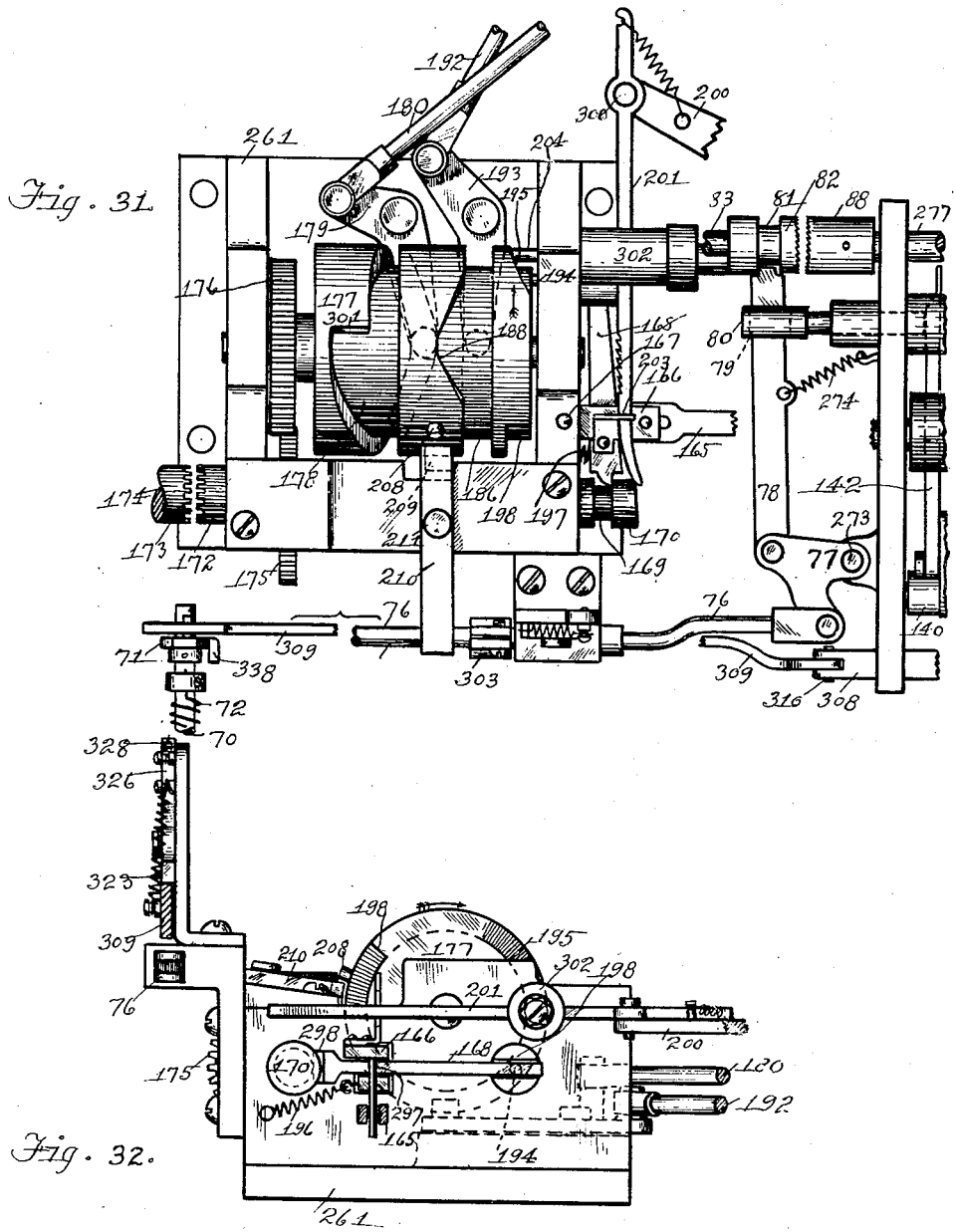

Sept. 27, 1932.  B. C. KENYON ET AL  1,879,693
AUTOMATIC SOUND REPRODUCING INSTRUMENT
Filed July 15, 1927  18 Sheets-Sheet 15

INVENTORS:
Wilmur W. Boa
Clifford H. Green
BY Bertram C. Kenyon
Cyrus W. Rice
ATTORNEYS.

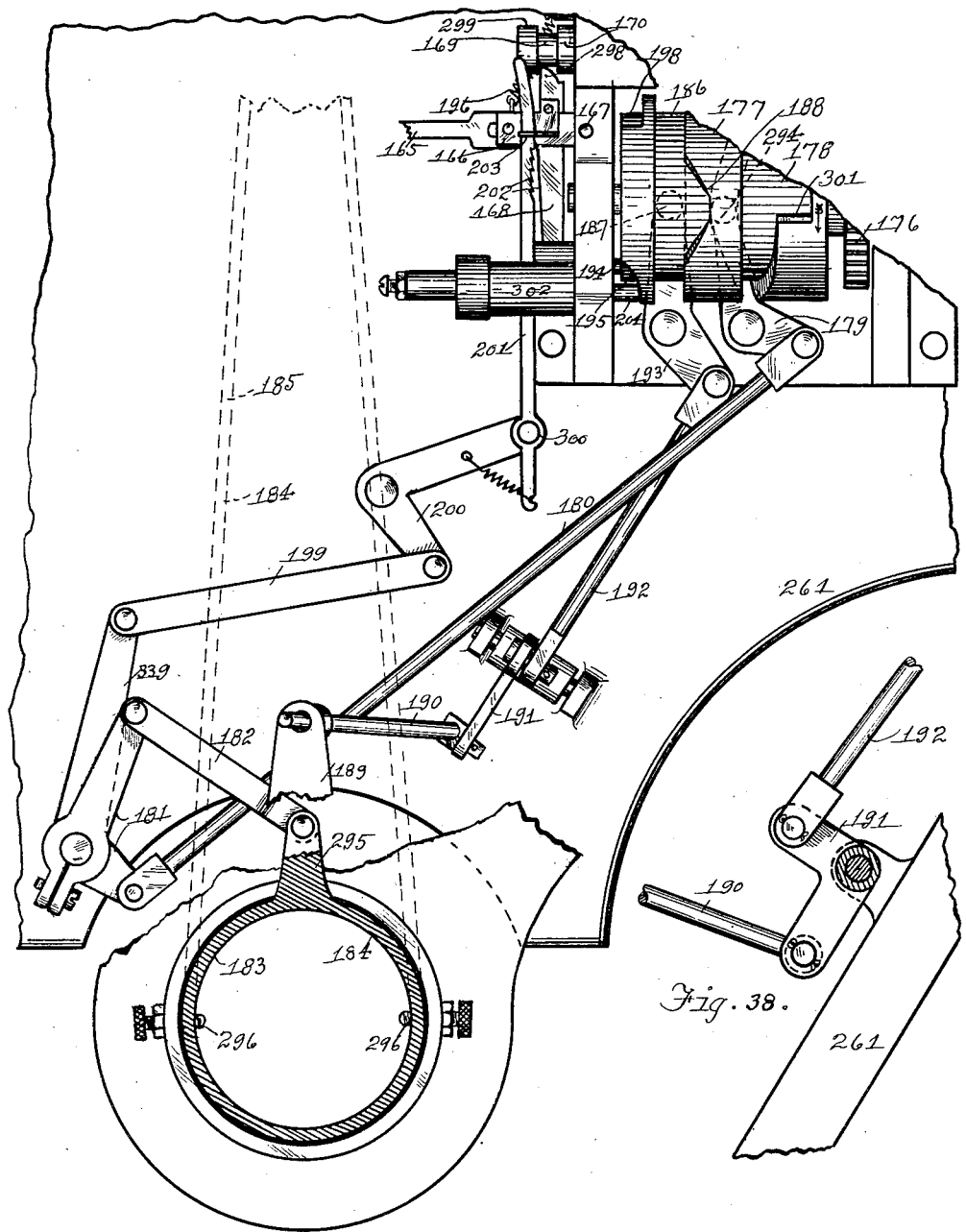

Sept. 27, 1932.　　B. C. KENYON ET AL　　1,879,693
AUTOMATIC SOUND REPRODUCING INSTRUMENT
Filed July 15, 1927　　18 Sheets-Sheet 17
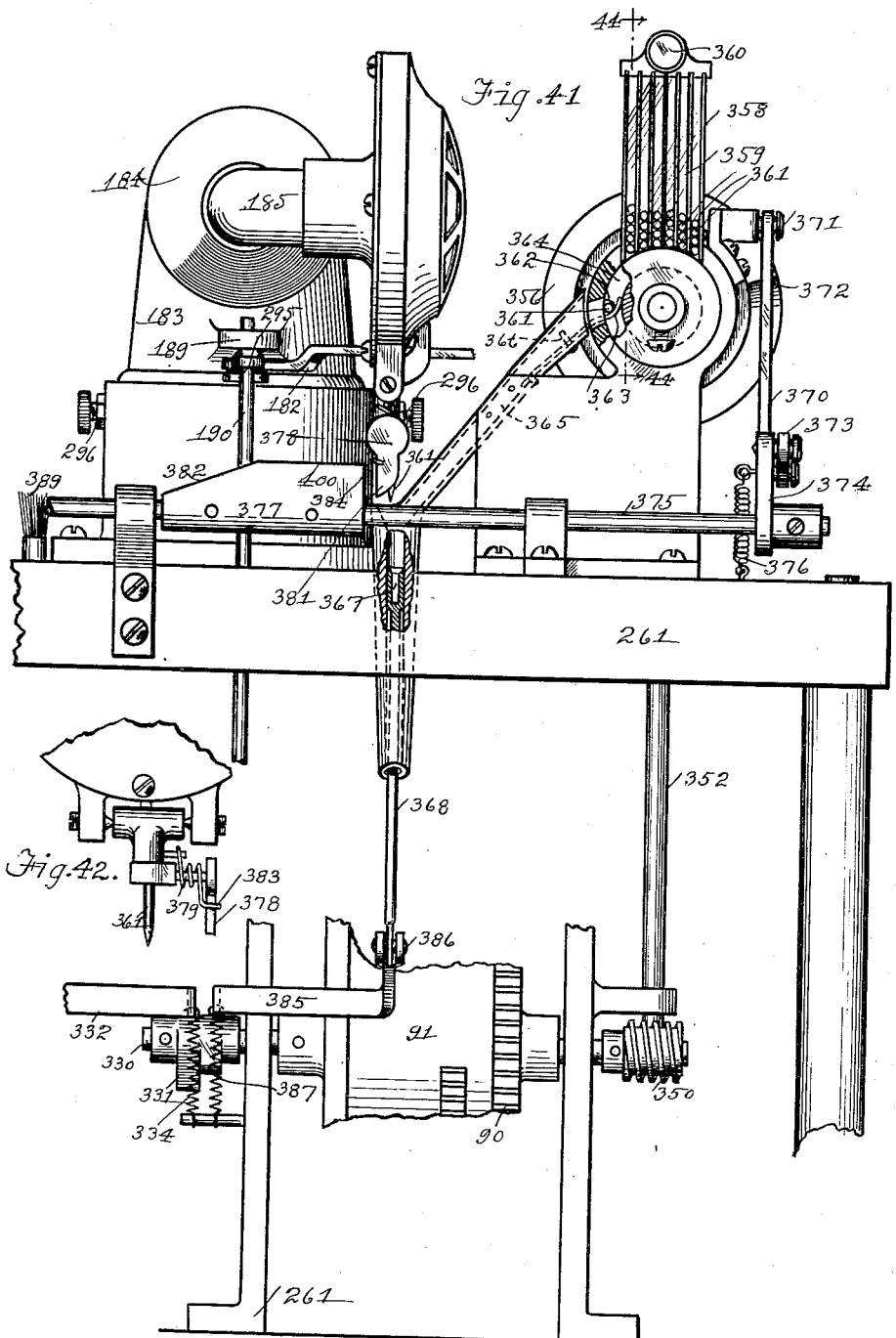

Sept. 27, 1932. B. C. KENYON ET AL 1,879,693
AUTOMATIC SOUND REPRODUCING INSTRUMENT
Filed July 15, 1927 18 Sheets-Sheet 18
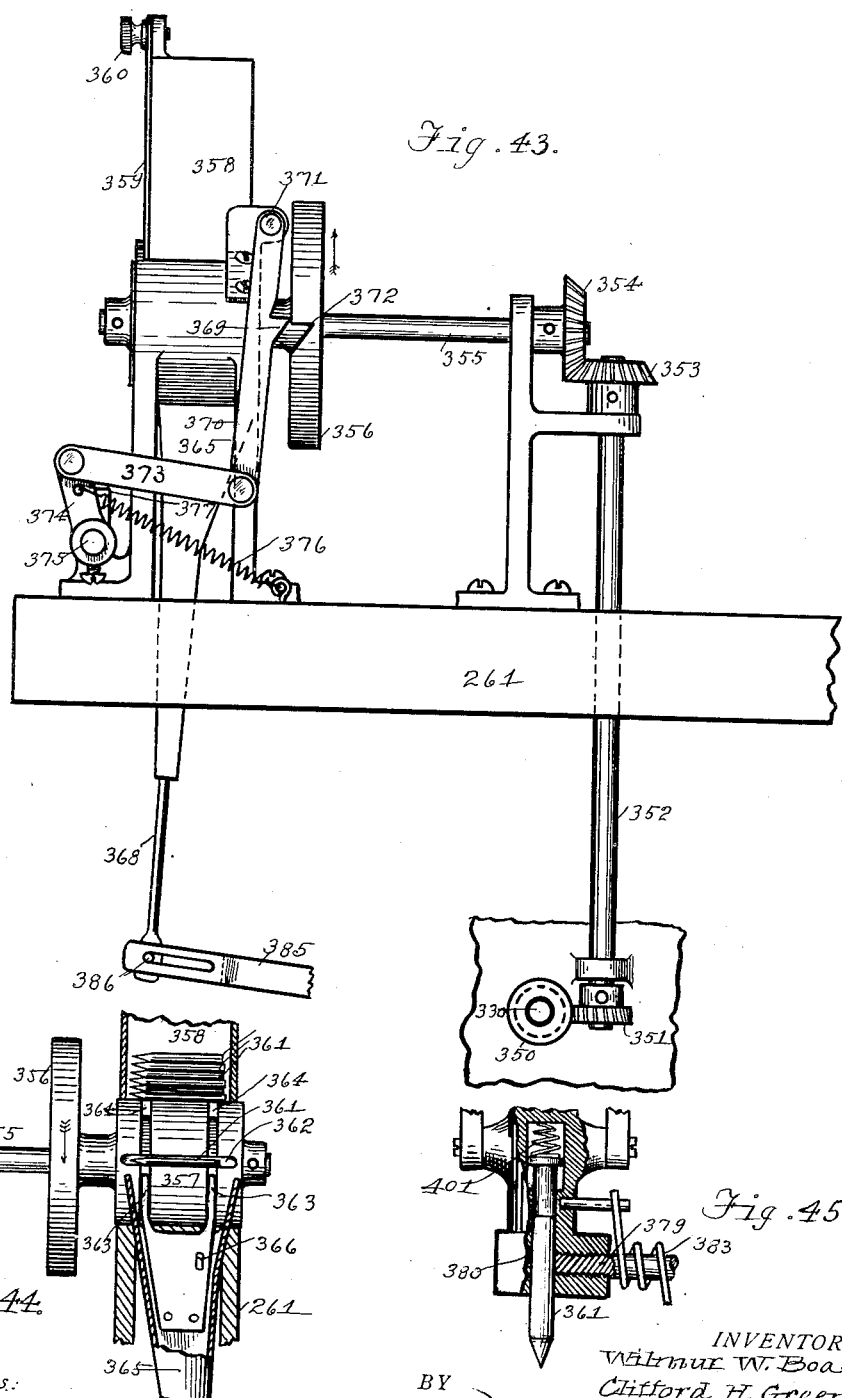

Patented Sept. 27, 1932

1,879,693

UNITED STATES PATENT OFFICE

BERTRAM C. KENYON, WILMUR W. BOA, AND CLIFFORD H. GREEN, OF GRAND RAPIDS, MICHIGAN, ASSIGNORS TO AUTOMATIC MUSICAL INSTRUMENT COMPANY, OF GRAND RAPIDS, MICHIGAN, A CORPORATION OF DELAWARE

AUTOMATIC SOUND REPRODUCING INSTRUMENT

Application filed July 15, 1927. Serial No. 205,921.

The present invention relates to coin-controlled graphophonic musical instruments; and its object is, generally, to provide such an instrument improved in respects hereinafter appearing; and more particularly, to provide improved means for initiating the operation thereof including an improved coin-chute; and further, to provide improved means for moving any desired one of a plurality of record disks to and from the turntable of the instrument; and further, to provide improved means whereby either of the records on the opposite sides of the disk may be selected to be "played"; and further, to provide improved means for moving the tone arm of the instrument into and out of operative relation with the record disk on the turntable; and further, to provide improved means for effecting the operations of the parts of the instrument in ordered sequence and for reversing the movements of, or for returning to initial positions, the said parts for subsequent operations of the instrument; and further, to provide improved means for changing the needles carried by the tone arm; and further, to provide improved mechanical connections and motion-transmitting mechanisms whereby the parts of the instrument may operate in ordered sequence.

These and any other objects hereinafter appearing are attained by, and the invention finds a preferable embodiment in, the instrument hereinafter particularly described in the body of this specification and illustrated by the accompanying drawings, in which:—

Figure 1 is a rear elevational view of the principal parts of the mechanism of our coin-controlled graphophonic musical instrument;

Figure 2 is an end elevational view of certain parts thereof, illustrating the coin-chutes and means for initiating the operation of the instrument;

Figure 3 is a top plan view of some of said parts and parts connected therewith;

Figure 7 is a top plan view of a portion of the mechansim for moving a record disk to and from the turntable of the instrument;

Figure 8 is an axially-sectional view of a clutch mechanism;

Figure 9 is a transverse sectional view thereof taken on line 9—9 of Figure 8;

Figure 10 is a top plan view of the instrument's "selecting arm" and of record disk-gripping mechanism carried thereby, and showing the disk-holding rack;

Figure 11 is a side elevational view of certain of said parts, looking toward the left-hand side of said selecting arm;

Figure 12 is a detail view of portions of the disk-gripping means;

Figure 13 is a side elevational view of some of said parts looking toward the right-hand side of the selector arm;

Figure 14 is an end view of certain of said parts, shown partially in section taken on line 14—14 of Figure 13;

Figure 15 is a sectional view of some of said parts taken on line 15—15 of Figure 13;

Figure 17 is an end elevational view of parts of the mechanism for actuating the instrument's operation and for operating its record-selecting means;

Figure 21 is a side view of the same portions viewed at right angles to the direction in which Figure 20 is viewed;

Figure 22 is a top plan view of the same, similar to Figure 20, but showing some of the parts in axial section;

Figure 23 is a right-hand end view of a cam-carrying drum;

Figure 24 is a side view of the right-hand end portion of said drum, showing mechanism actuated thereby for operating the instrument's parts in sequence;

Figure 27 is a left-hand end view of said drum, its cam-plate being removed;

Figure 28 is a cross-sectional view of the same drum and an idler gear, taken on line 28—28 of Figure 21;

Figure 29 is a view in perspective of said idler gear;

Figure 30 is a detail view, partly in section, of means for transmitting motion from the rotation of said drum;

Figure 31 is a top plan view of a portion of the means for operating the instrument's tone-arm, including a cam-carrying drum and mechanism moved thereby;

Figure 32 is a right-hand end view of said drum and such mechanism;

Figure 37 is a top plan view of said drum and of connections between it and the tone arm for operating the latter;

Figure 38 is a side view of a portion of said connections;

Figure 5:
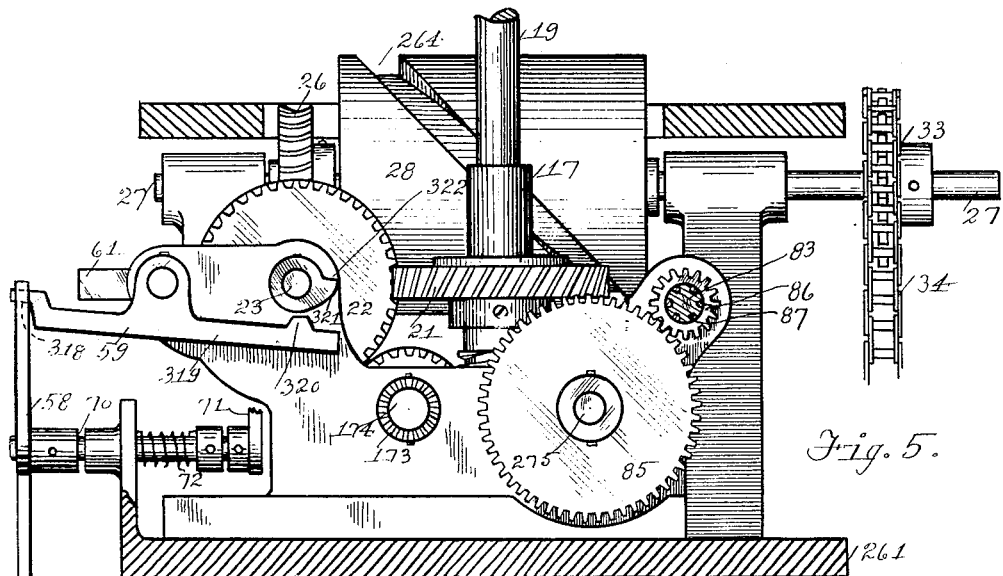
Figure 5 is an elevational view of certain parts, some of which are seen in Figure 4, other parts being sectioned on line 5—5 of Figure 1.

Figure 39 (on the same sheet with Figure 2) is a sectional view of the coin-chute, and other parts shown in said view, taken on line 39—39 of Figure 2;

Figure 40 is a sectional view of the same, taken on line 40—40 of Figure 39;

Figure 41 is an elevation of the means for changing the needles held by the tone arm and operating mechanism therefor;

Figure 42 is an elevation of a portion of the tone arm, showing a needle held thereby and a portion of said needle-changing means;

Figure 43 is an elevation of the needle-changing means viewed in a direction at right angles to that in which Figure 41 is viewed;

Figure 44 is a view of a portion of said means, partially sectioned on line 44—44 of Figure 41; and Figure 45 is a view of the end portion of the tone arm, shown partially in section, with a needle held thereby.

The coin-controlled graphophonic musical instrument illustrated by said drawings comprises means for initiating the operation thereof, means for rotating a turntable supporting the record disk being "played", means for moving any desired one of a plurality of such disks to the turntable preparatory to playing the selected one of either of the records on its opposite sides and for returning the disk from the turntable, means for moving the tone-arm carrying the record-engaging needle into and out of operative relation with the disk, means for effecting the operations of such parts in ordered sequence, means for reversing the movements of, or returning to initial positions, the said parts for subsequent operations of the instrument, means for changing the needles carried by the tone arm, and other means more or less subsidiary to the said various means and contributing to their sequential and positive operations.

In the embodiment of the invention chosen for illustration by said drawings and for detailed description in the body of this specification, the operative parts are carried by a frame 261 enclosed in a suitable casing 212 having preferably a glazed front opening through which such parts and their operation may be seen. A plurality of record disks 214 are contained in the casing any one of which and the record on either of its opposite sides may be selected for playing. Coin chutes designated generally 215 are arranged side by side adjacent the front of the instrument, and in operative registration respectively with the record disks to be selected for playing.

The illustrated means for initiating the operation of the instrument and the operation thereof are as follows (referring now particularly to Figures 2 and 17):

Each of the several coin-chutes 215 comprises a fixed portion 216 and a portion 217 swingably mounted at 218 and having a handle 219 and a coin-receiving opening 220 outside the casing, as particularly well seen in Figures 2 and 3. A coin 221 being inserted into said opening falls in the chute's portion 217 and into held engagement with the bight 247 of a spring 222 surrounding chute portion 217 near its vent 223. This chute portion 217 is now swung inwardly by its handle 219, the upper edge 224 of the coin in such movement striking the end 225 of the downwardly extending rib 226 of an arm 227 swingably mounted at 228, and thus swings said end upwardly and out of its locking engagement with the inner edge 229 of chute portion 217 immediately below the slot 230 through which this arm 227 and its said rib slidably passes. The chute portion 217 being thus unlocked and free to swing farther inwardly, the coin is carried thereby to a position wherein said rib's cam edge 231 presses the coin downwardly, expanding or straightening spring 222 to release its bight 247 from the coin, the sides 232 of the main or web portion of arm 227 sliding in this movement of chute portion 217 in the lateral extensions 233 of said slot 230 (Figures 39, 40).

This chute portion 217 having now reached the position indicated in dotted lines in Figure 2, and its vent 223 being in registration with the upper end 234 of the chute's fixed portion 216, the coin falls into and through this fixed portion and out of its vent 235, dropping on the bell-crank lever 1 fulcrumed at 2 on an element 3 rockably mounted on a horizontal tube or sleeve 4. The falling coin depresses (against the pressure of a weak spring 50) the arm 236 of lever 1 and disengages the other arm 5 of said lever from its holding engagement with the arm 6 fulcrumed at 7 on said element 3. This arm 6 being thus released from lever arm 5, its upper end 262 is swung by spring 238 into the path of the registering pin or tooth 40 of a rotatable cylinder 39 (for the purpose hereinafter explained) and the lower end 237 of arm 6 is pressed by said spring into engagement with the long horizontal rod member 8 of the arm 239 of a bell-crank lever designated generally 9 on shaft 240 and this lever's other arm 10 is thus moved to swing by the link 11 a lever arm 12 toward the left-hand side of Figure 2 and out of holding engagement at 241 with a lever 13 fulcrumed at 249, so that the switch arm 14 (on which arm 12 is pivoted at 242) may fall into contact with the contact points 243 and close the electric switch 244 in an electric circuit 245 containing the driving electric motor 246 (Figure 1).

The operation of the mechanism of this instrument being now initiated by closing said electric circuit, the turntable 255 is rotated by the following means (referring now particularly to Figures 1 and 4):

The shaft of motor 246 has a sheave 250 carrying a belt 251 also carried by a sheave 252 on shaft 15 whose worm 253 meshes with gear 16 on a vertical sleeve shaft 17 carrying a hollow drum 18 in frictional contact wherewith is the outer end of a coiled spring 254 whose inner end is fastened to a vertical shaft 19 which is inside shaft 17 and carries at its upper end the turntable 255 on which the record disk being played is supported. This spring 254 thus provides a yieldingly frictional drive for the turntable, whose rotating speed may be controlled by a governor 20 of usual form whose shaft 256 having the worm 257 is driven by the meshing gear 258 on shaft 19.

The means for selecting the desired record disk to be played and for conveying the same to and from the turntable, and the operation of such means, are described as follows (referring now particularly to Figures 7, 10–16, etc.):

A rack 259 arcuate in plan, indicated in Figure 10, contains a plurality of record disks 214 spaced side by side in grooves or pockets 260 of the rack and extending radially from the vertical shaft 19. These disks have records on their opposite sides and the record on either side may be selected for playing, there being twice as many coin chutes 215 as there are record disks, i. e., one chute for each record. The axially-horizontal cylinder 39 rotatable in bearings 263 (Figure 17) has the radially-extending pins or teeth 40 spaced in the cylinder's axial direction and, as shown, helically disposed around the cylinder. These pins or teeth correspond in number, and register in position, with the coin chutes respectively, each chute having its corresponding tooth or pin. The motor drives the disk-selecting mechanism (which includes said cylinder) by the following means:

The sleeve shaft 17 (Figures 4 and 5) has a skew gear 21 meshing with the skew gear 22 on shaft 23, which shaft when coupled (as hereinafter explained) with its aligned shaft 24 having a worm 25 (Figure 6) meshing with a gear 26 on shaft 27, rotates the cylinder 39 by means of a chain 34 carried by the sprocket wheel 33 on shaft 27 and the sprocket wheel 35 on shaft 36 (Figure 3) whose bevel gear 37 meshes with gear 38 on the shaft of cylinder 39.

Figure 4:
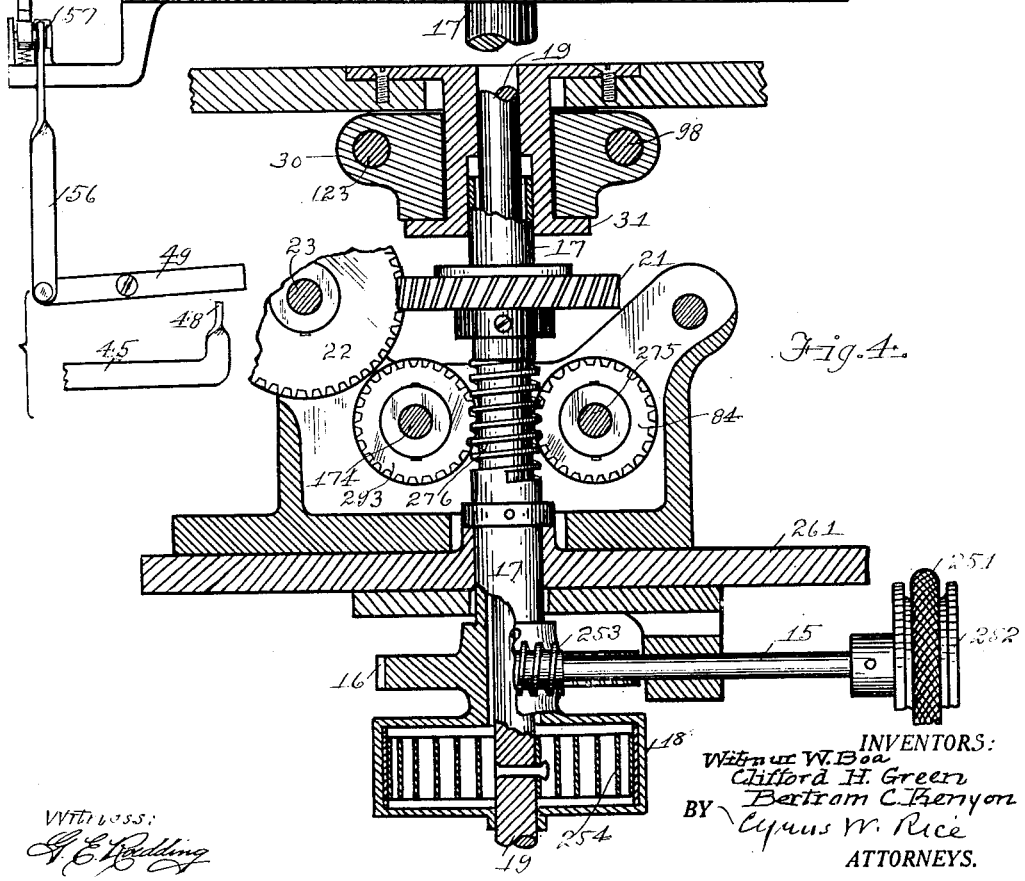
Figure 4 is a vertical axially-sectional view of certain driving means and connections of the instrument, taken on line 4—4 of Figure 1.
Figure 6:
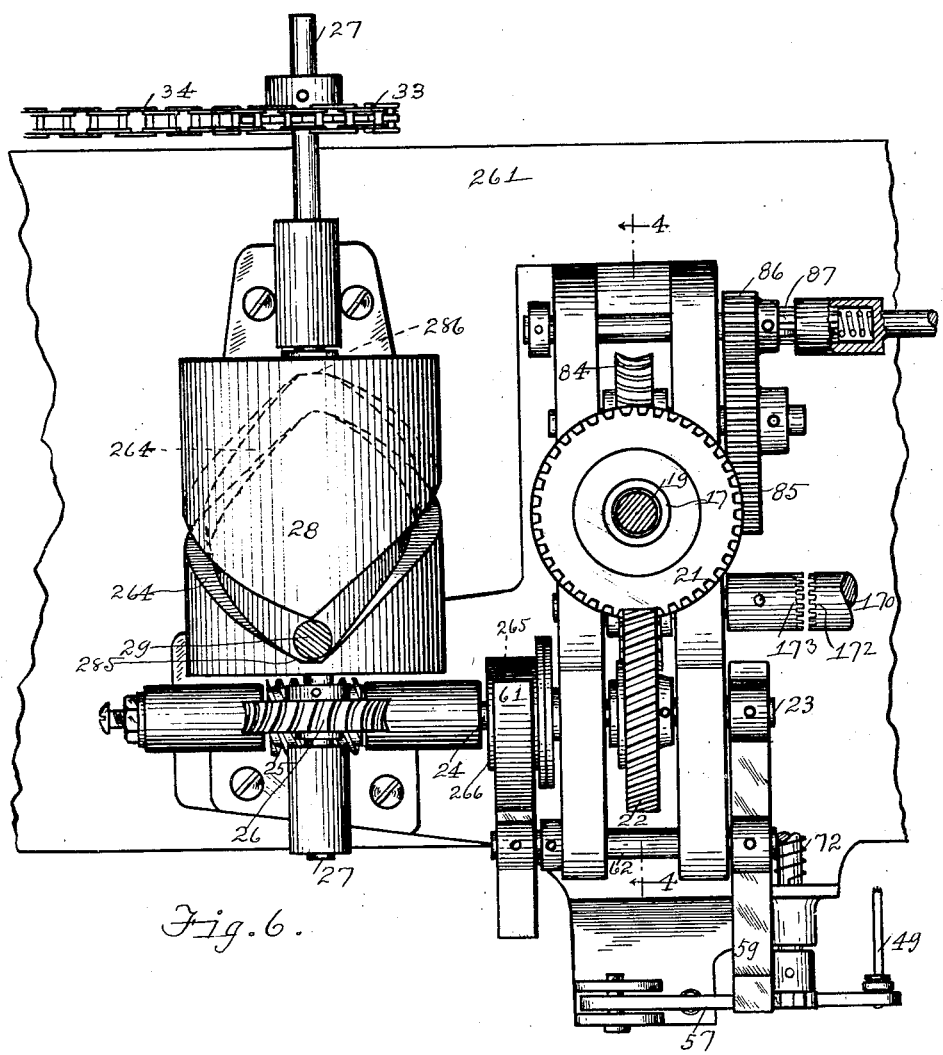
Figure 6 is a top plan view of parts shown in Figure 5.

A "selector arm" 30 (Figures 1, 4, 7, 10) swingable in a horizontal plane (on a radial flange of a collar 31 depending from the frame) concentrically with the turntable's shaft 19, extends toward the record disks' rack 259 and carries means for gripping said disks and moving the same to and from the turntable. This selector arm has a downwardly extending pin 29 engaging in the annular cam groove 264 of a cylindrical drum 28 carried by shaft 27 (Figures 4, 5, 6). The rotation of this drum during the coupled relation of shafts 23 and 24 (as and by means hereinafter explained) causes this pin 29 to travel in the groove 264 and to thus swing the selector arm into registering position with the particular record disk in the rack 259 which corresponds with the chute into which the coin has been dropped; and when the drum 28 ceases to rotate by reason of shafts 23 and 24 being uncoupled, said groove retains the pin and selector arm in said registering position to permit the selected record disk to be moved to the turntable, "played" thereon, and thereupon returned to the rack—during all of which operations this drum is at rest and the shafts 23 and 24 are uncoupled.

The aligned shafts 23, 24 are coupled together for rotating the drum 28 by a clutch designated generally 265 indicated in Figure 6, and particularly shown in Figures 8 and 9. The driving shaft 23 has in its head 266 a diametrically disposed slidable plunger or clutch member 64 spring-pressed at 267 outwardly into clutching engagement in a hole 268 extending through the side wall of the hollow head or clutch member 66 of the shaft 24. This plunger 64 is pressed inwardly (to unclutching position) by a clutch fork 61 carried by a shaft 62. This clutch fork has on one of its arms an inwardly extending lug 269 pressed by a spring 60 into the hole 268 and against the outer extremity of the plunger 64, thus overcoming the weaker spring 267 and pressing the plunger out of the hole (in effect closing said hole) and holding the plunger out of its clutching engagement, and also positively holding the shaft 24 against rotation. The shafts 23 and 24 are shown in Figure 8 coupled by this clutch, and in Figure 9 uncoupled.

Figures 18, 19:
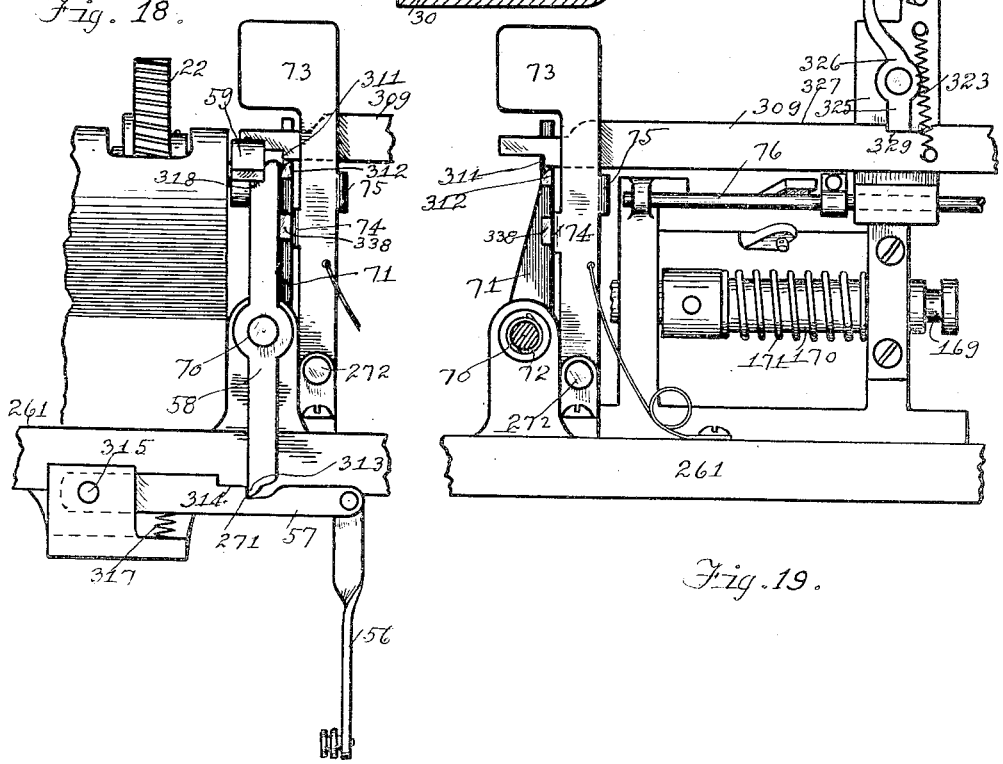
Figure 18 is a side elevational view of portions of the means whereby certain parts of the instrument's mechanism are caused to operate in sequence.
Figure 19 is a like elevational view of some of the same portions of said means and of other portions cooperating therewith.

By the operation of the motor (as hereinbefore explained) the selector arm 30 begins to swing to its position registering with the record disk in the rack corresponding with the chute into which the coin has been dropped, and when such registering position has been reached, its swinging movement ceases by the uncoupling of the shafts 23 and 24, which uncoupling is effected by the following means:

When the cylinder 39 has been turned (as hereinbefore explained) far enough for its pin or tooth 40, (which registers in position with the chute into which the coin has been dropped) to strike the upper end 262 of the arm 6 (Figure 17), the element 3 is thereby rocked downwardly at its right-hand end, and the lower portion 237 of arm 6 riding on the fixed horizontal rod 42 is cammed or swung toward the right-hand thus moving this arm 6 into retracted position in which it is held by the arm 5 of bell crank lever 1 to reset this part of the mechanism for a subsequent operation of the machine. During this rocking movement of element 3, its arm 51 strikes the horizontal rod 43 extending through the rocker plate 44 (Figure 2) which is keyed to shaft 52 turning in the horizontal sleeve 4. The rising movement of rod 43 rocks the right-hand arm 53 of plate 44 down, thus permitting an arm 45 (pivoted at 270 on said plate) to swing down. When the cylinder 39 (continuing to rotate) has now turned far enough, the upper end 262 of arm 6 is withdrawn from pin or tooth 40 by its lower end 237 being farther cammed or swung to the right-hand by riding on the rod 42. The spring 43 (Figure 17) now swings the right-hand arm of element 3 upwardly and permits the spring 46 (Figure 2) to swing arm 53 of plate 44 upwardly. This movement, by said plate's pin 47 suddenly swings the arm 45 upwardly. This arm 45 acts as a hammer, its free end 48 suddenly striking a lever 49 whose link 56 (Figures 2 and 18) swings down lever catch 57 (pivotally mounted at 315) and releases from its notch 271 the lower end 313 of the latch lever 58 carried on shaft 70 (Figure 18). The upper arm of this latch lever is swung by spring 72 out of the supporting engagement by its shelf 318 with an arm 59 on shaft 62 which carries the clutch fork 61, thus permitting spring 60 to expand and upcouple shafts 23 and 24 (Figures 8, 9).

The selector arm 30 being in the swung position which registers with the disk selected to be played (and remaining in that position until the cycle of the machine's operations is again initiated), said disk is removed from the rack and placed upon the turntable by the following means:

The shaft 70 carries an arm 71 which by the spring 72 is swung suddenly to the right-hand side of Figure 19 when the latch lever 58 is released as hereinbefore explained. The portion 338 of this arm 71 strikes at 74 a hammer 73 pivotally mounted at 272 and causes its part 75 to strike the slidable plunger 76 (Figure 19). Said plunger being thus slid rocks bell-crank lever 77 fulcrumed at 273 (Figures 31, 22, 20) and thereby pulls down (against the pressure of a spring 274) the catch 78 (slidable in a slot 79 in a plunger 80) and thus moves this catch out of holding engagement in a notch 81 in clutch member 82 whose shaft 83 (Figure 1) is splined at 87 (Figure 5) with gear 86 meshing with gear 85 on whose shaft 275 is a worm gear 84 (Figure 4) meshing with the worm 276 on the driving sleeve shaft 17.

Figure 26:
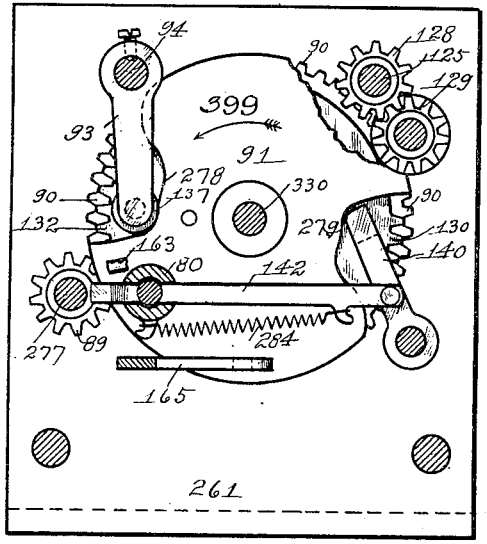
Figure 26 is a left-hand end view of the said drum illustrating the cam-plate carried thereby, certain parts being shown in section taken on line 26—26 of Figure 22.

The aligned shafts 83 and 277 being now coupled by the engaging clutch members 82, 88 (Figures 1, 31, 22, 20, 21, 24), the gear 89 rotates a drum 91, meshing with its gear 90. This drum has identical diametrically-opposite cam depressions 278, 279 formed in the edge of its end plate 399 (Figure 26). In one or the other (depending on the turned position of this drum at the time), the free end of an arm 93 (desirably provided with an anti-friction roller 137) falls and is swung or cammed out of the depression by its inclined rise, and against the pressure of a spring 280 (Figure 7) so that said roller then travels on the periphery of said drum in its rotative movement. In Figure 26 the roller 137 is shown as having just dropped into depression 278. The said camming-out of this roller from the depression causes the jaws 113 (Figures 10, 16) to grip the record disk in the rack or on the turntable (as the case may be), and the falling of said roller into such depression causes these jaws to release the disk, all as hereinafter explained.

The arm 93 is keyed to a shaft (Figure 7) comprising portions 94 journalled on the frame of the structure, 98 journalled on the selector arm 30, and an intermediate portion 97, these portions being connected by Hooke's joints 95, 96 (Figures 1, 7). When this arm 93 is cammed-out of the depression, the arm 99 of shaft portion 98 (Figure 16) engaging in a notch 100 in plunger 101 (which is connected by a swivel joint 102 with an aligned plunger 103) moves toward the left-hand side of Figure 16 the said plungers in their slide bearing 281 in the selector arm 30 (Figures 7, 10, 16).

Figure 16:
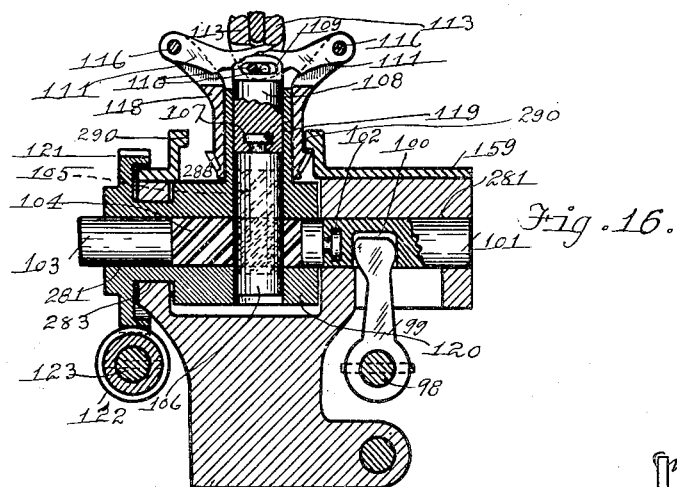
Figure 16 is an axially-sectional view of portions of the mechanism for moving the record disks to and from the turntable, certain parts being transversely sectioned on line 16—16 of Figure 7.

The plunger 103 has on its flat side inclined rack teeth 104 meshing with the inclined rack teeth 105 (indicated in dotted lines) on the flat side of a plunger 106 disposed at right angles to plunger 103, so that the sliding movement of plunger 103 moves said plunger 106 slidably in a bearing in a member 120 which member is rockable in a bearing 283 in the selector arm 30 (Figure 16). The plunger 106 has a swivel connection 107 with an aligned slidable rock shaft 108 having adjacent its outer end a transverse slot 109 in which slidably bear the pins 110 carried by a pair of arms 111 pivotally mounted at 116 respectively on a sleeve 118 turnable around a projecting portion 119 of said member 120 through which member the rock 108 extends. It will be seen that the longitudinal movement of this rock shaft 108 caused by the sliding movement of plunger 106 causes the jaws 113 of the arms 111 to project forward and grip between them the edge portion of the selected record disk, or to release the same from such gripping engagement, depending upon the direction in which plunger 106 and rock shaft 108 may be slid (Figures 16, 10, 7). Said camming-out of arm 93 from the cam depression having caused the jaws 113 to grip the selected record disk in the rack, such gripping action continues until the roller 137 drops, in the rotation of drum 91, into the opposite cam depression (in the present instance, depression 279 Figure 26). The selected record disk, thus gripped, is first raised out of its pocket 260 in the rack 259 and is then turned to position it on the turntable with the side up having that one of its two opposite records which has been selected to be played.

The annular groove 264 of the drum 28 (Figure 6) has opposite points, 285 adjacent one end of the drum and 286 adjacent its other end. The records on one side of the record disks respectively selected for playing are moved to the turntable when the selector arm's pin 29 is in some position (in its travel in this groove) between points 285 and 286, and the selected records on the opposite sides of the disks respectively are thus moved when the selector arm's pin is between points 286 and 285 in such travel, the respective records on the opposite sides of any disk being thus placed facing upwardly on the turntable when the pin 29 is at approximately the same distance but in opposite directions from point 285 or from point 286.

In its movement into registration with the record corresponding to the chute into which the coin has been dropped, the selector arm 30 (under the action of its pin 29 travelling in groove 264) swings to the left-hand side or to the right-hand side (as the case may happen to be) and causes an end of the rack 150 (mounted thereon and slidable transversely thereof) to strike either the adjustable stop 151 or the opposite adjustable stop 162 (Figures 13, 14), depending on the direction in which the selector arm 30 is swinging. On striking either of these stops this rack is slid by the selector arm's movement, causing its teeth 152 meshing with a pinion 153 to rotate the same and its shaft 154 journalled on said arm. This shaft has a cam 155 which is embraced between the arms of a fork 287 on the lower end of lever 156 fulcrumed loosely on shaft 98 (Figures 10, 13, 15). The pin 157 at the opposite end of this lever engages in a hole 158 in the sleeve 159 which embraces and slides longitudinally on the member 120 (Figures 10, 13, 15). This sleeve 159 is thus slid by the lever 156 toward the right-hand or the left-hand side of Figures 10 and 16 thus causing either its toothed segment 160 or its opposite toothed segment 161 to move into position to be brought into mesh with the gear 288 of the sleeve 118. It is evident that when the segment 160 is meshing with gear 288 the sleeve 118 will be turned in the direction opposite to that in which it will be turned when segment 161 is in mesh with said gear. When out of such mesh (as seen in Figure 10) the gear 288 and sleeve 118 are held from turning by one or the other of its flattened opposite sides 289 engaging one of the annular ribs 290 of sleeve 159 (Figure 10). The member 120 is rotated in its bearing 283 on the selector arm 30 to raise the selected record disk from the rack and is oppositely rotated to return the same to the rack by said member's skew gear 121 with which meshes a worm 122 on a shaft comprising a portion 125 journalled on the frame of the structure and having a gear 128, a portion 123 journalled on the selector arm and having said worm, and an intermediate portion 124, these portions being connected by Hooke's joints 126, 127 (Figures 16, 10, 11, 7). The intermediate portions 97 and 124 of the two parallelly disposed shafts, as particularly shown in Figure 7, have parts slidably connected by splines 291, 292 to permit the necessary movements of the mechanisms driven by said shafts.

The gear 121 and member 120 (and parts carried thereby) are turned approximately half a revolution by the gear 128 on shaft 123, 124, 125 and by the following means, to move the gripped selected record disk from the rack to the turntable:

The approximately ninety-degrees toothed sector 130 of the drum 91 in its rotation is brought into mesh with an idler gear 129 meshing with said shaft's gear 128. Said shaft 123, 124, 125 thus turned, first rotates member 120 sufficiently to lift the selected record disk clear of its pocket in the rack, and thereafter by the continued turning movement of said member 120 brings the gear 288 of sleeve 118 into mesh with either toothed segment 160 or 161 of the sleeve 159, depending upon the then slid position of said sleeve 159. The sleeve 118 is thus turned a quarter revolution, carrying the record disk held by the jaws 113 from a vertical position, and by the continued turning movement of member 120 deposits the disk in a horizontal position on the turntable (Figures 10, 16). The continued rotation of drum 91 now permits the arm 93 and its roller 137 (Figure 26) to fall into the other depression (279) which action causes the arm 99 to slide the plungers 101, 103 toward the right-hand side of Figure 16 thus causing the jaws 113 to separate and release the record disk lying on the turntable (Figures 13, 26). The disk clutching and moving mechanism is now at rest and the rotation of the drum 91 is stopped by the free end of a pivotally mounted arm 140 falling (by pressure of a spring 284) into the opposite cam depression—in the present instance, depression 278 (Figure 26). This arm 140 thus moves toward the left-hand side of Figure 26 a bar 142 to the position seen in Figure 22 wherein its inclined outer end portion 143 engaging the end of plunger 80 has slid it toward the left-hand side of Figure 22 thus disengaging clutch members 82, 88.

Figure 20:
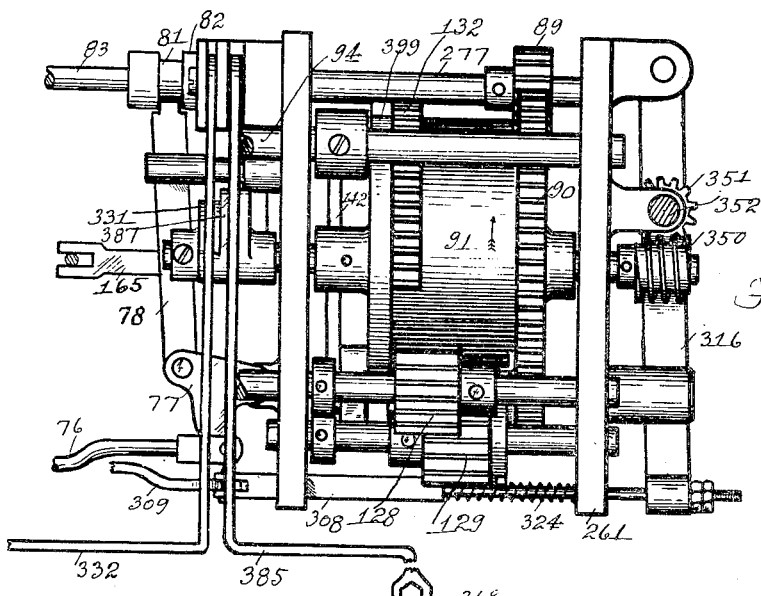
Figure 20 is a top plan view of other portions (including a cam-carrying drum) of said means whereby certain parts of the instrument's mechanism are caused to operate in sequence.
Figure 21:
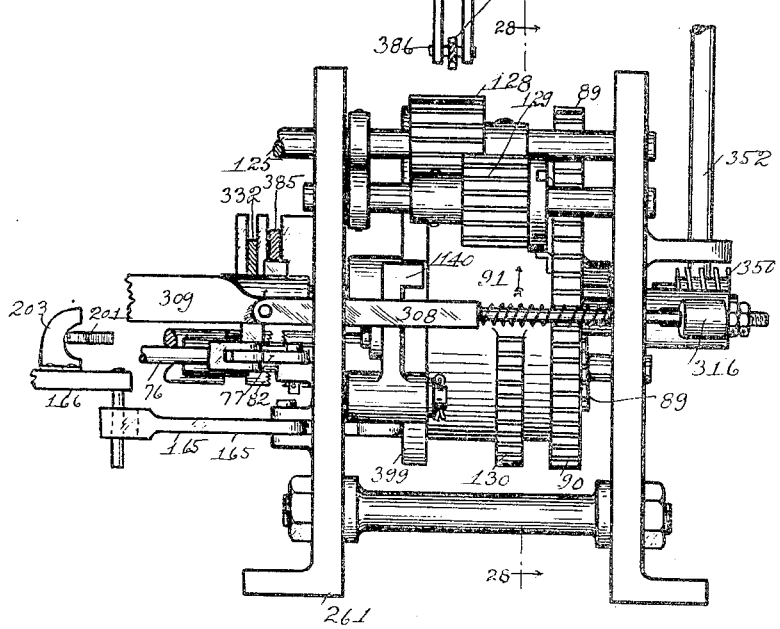

The tone arm is now moved to operative position as hereinafter explained and the record disk on the revolving turntable is played. After the record has been thus played, it is returned to the rack by the following reverse movement of the disk clutching and moving mechanism:

The drum 91 having been caused (as hereinafter explained) to resume its rotation, the roller 137 is cammed out of the depression in which it has been resting—in this instance, depression 279—(Figure 26) thus causing the jaws 113 to clutch the edge portion of the played disk lying on the turntable; whereupon the rotation of said drum brings its approximately ninety-degrees toothed sector 132 into mesh with gear 128 on shaft 123, 124, 125 and thus (the idler gear 129 being now out of mesh with sector 130) turns said shaft reversely to its turning movement heretofore described, and reversing the turning movement of the member 120, lifts the record disk from the turntable, turns it to vertical position and deposits it in its pocket in the rack (Figures 23, 20, 10). Thereupon, the roller 137 of arm 93 is by the continued rotative movement of drum 91 permitted to fall into the succeeding depression (278), thus causing the jaws 113 to separate and release said record disk now in the rack. Between the meshing of sector 130 with idler gear 129 and the meshing of sector 132 with gear 128, this idler gear is held from turning by the arcuate rib 133 carried by drum 91 entering groove 134 of the idler gear, or by the arcuate rib 135 carried by said drum entering groove 136 of the idler gear (Figures 28, 27, 29).

Figure 33:
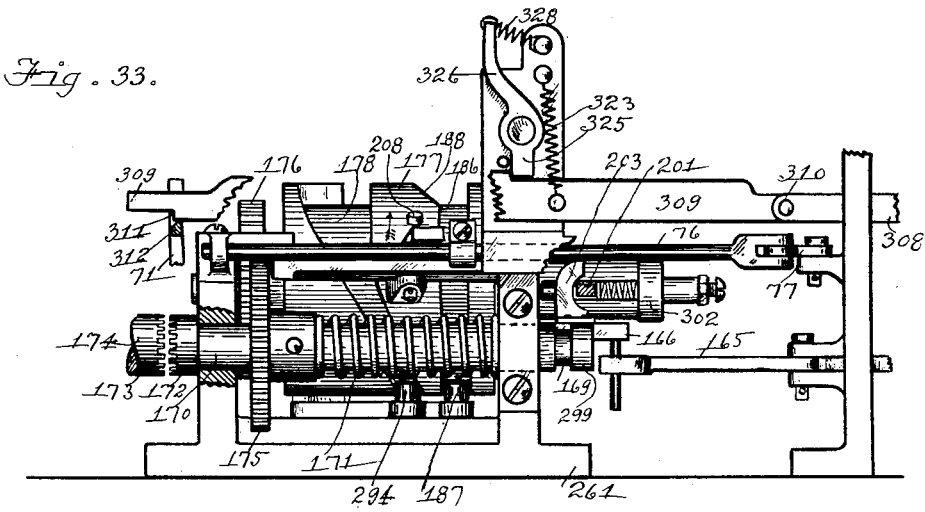
Figure 33 is a side view of the same drum and adjacent parts.
Figure 36:
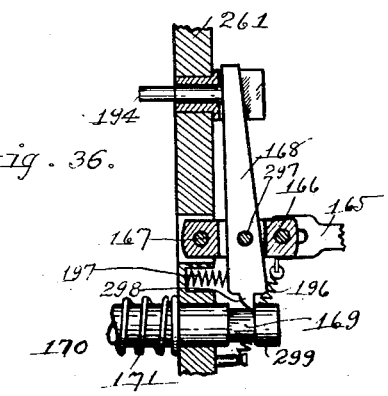
Figure 36 is a view of mechanism operating to engage clutch members.

The record disk having been placed on the turntable and released from the gripping mechanism (as hereinbefore explained) preparatory to being played, the tone arm is swung over the said disk into operative position and, after the record is played, is swung reversely to initial position, by the following mechanism:

Just before drum 91 ceases the first portion of its revolution wherein it operates the disk clutching and moving mechanism to position the record disk on the turntable, a lug 163 (Figures 22, 30) carried by said drum engages and swings a bell-crank lever 165 (Figure 36) whose forked end engages and rocks an arm 166 pivotally mounted at 167, which action raises and withdraws catch 168 from the notch 169 of the shaft 170, thus allowing spring 171 to slide said shaft toward the left-hand side of Figures 36 and 33 and engage its clutch member 172 with clutch member 173 on shaft 174 whose gear 293 meshes with and is driven by the worm 276 (Figure 4). Gear 175 on the now rotating shaft 170 meshing with gear 176 (Figure 33) of the cam drum 177 (Figures 33, 31) rotates said drum. The cam groove 178 of this drum in which travels the pin 294 of a bell-crank lever 179 (Figure 37) swings said lever to turn by the link 180 a bell crank lever 181, whose movement by means of the link 182 connected to an arm 295 of the vertical portion 183 of the tone arm 184 swings the tone arm so that its horizontal portion 185 moves horizontally over the turntable and into a position wherein the needle carried thereby is above the outmost turn of the record's spiral groove.

Figures 34, 35:
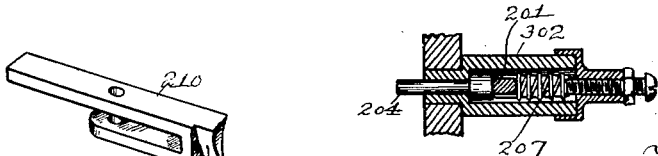
Figure 34 is a view in perspective of a cam lever operated by said drum.
Figure 35 is an axially-sectional view of a housing, showing a plunger and spring contained therein.

The tone arm having reached this swung position, it is lowered on its pivotal mounting 296, so that the needle may enter said groove of the disk, by the following means:

The horizontal portion 185 of the tone arm is held suspended by the tone arm's lateral extension 189 (Figure 37), said extension being supported by a link 190 whose lower end is carried by a bell crank lever 191. This lever is maintained in such supporting position by a link 192 connected to a bell-crank lever 193 whose pin 187 travels in the cam groove 186 of drum 177. When this drum has been turned to the position wherein the tone arm's needle is in its aforesaid position, the pin 187 enters said groove's depression 188, thus permitting the tone arm to fall by gravity and position the needle in the record's said groove. The drum 177 is now stopped from rotating (while the record is being played) by the following means:

This drum 177 has at its right-hand end in Figure 31 or left-hand end in Figure 37 diametrically-opposite identical cams each having a rise 195 and a sudden drop 198. The end of plunger 194 rides on these cams and, when slid (by the rise 195 of either cam) toward the right-hand side of Figures 31 and 36 or to left-hand side of Figure 37, swings the upper end of catch lever 168 fulcrumed at 297 on the arm 166 (Figure 36) in said direction. This action moves the lower end 298 of said catch lever (which during the engagement of clutch members 172, 173 has been riding on the annular rib 299 of clutch shaft 170) toward the left-hand side of Figure 36, and (by the pressure of spring 196) into the annular notch 169 as seen in Figure 36. When the continued rotation of drum 177 permits plunger 194 to fall from the end cam at its drop 198, the spring 197 (which is stronger than spring 171) slides the clutch shaft 170 toward the right-hand side of Figures 36 and 33, thus disengaging the clutch members 172, 173 and stopping the first half-revolution of drum 177. While the turntable is rotating and the record disk thereon is being played, the consequential swinging of the tone arm in a right-hand direction toward the center of the disk causes, by means of the bell-crank lever 181, 339, link 199 and bell-crank lever 200, the toothed rod 201 (pivoted at 300 on lever 200) to move lengthwise and toward the upper end of Figure 37, until one of its teeth 202 engages with a catch 203 carried by the swingably mounted arm 166 (Figures 37, 36). The longer the tone-producing spiral groove of the record, the farther the rod 201 will be thus moved, and therefore a plurality of such teeth 202 are provided. From the inner end of said groove, at the close of the playing of the record, the needle runs into an eccentric groove of the record disk, so that the tone arm is given thereby an oscillating movement which causes the tooth of rod 201 engaging the catch 203 to swing arm 166 toward the bottom of Figure 37 and thus withdraw the end 298 of lever catch 168 from the annular notch 169 of clutch shaft 170 so that the clutch members 172, 173 again engage and cause the drum 177 to perform its second half-revolution whereby the tone arm is raised from the record and returned to its initial and inoperative position, by means of the camming of the pin 187 of lever 193 out of the depression 188 of cam groove 186 and thereupon the riding up of pin 294 of lever 179 on the rise of cam groove 178 (Figure 37). The widest portion 301 of the cam groove 178 permits the tone arm to swing the half width or radius of the record. Another plunger 204 rides on the end cam of drum 177 moving up its rise 195 and falling from its drop 198 slightly sooner than plunger 194 thus rides and falls. When plunger 204 rides up said rise it swings rod 201 (against the pressure of a spring 207 housed in a barrel 302) toward the left-hand side of Figure 37 and thus holds this rod's teeth 202 out of engagement with catch 203 (Figures 37, 35). The lever 166 fulcrumed at 167 and carrying this catch 203 (now released from the teeth of rod 201) is by the spring 196 swung toward the upper end of Figure 37 or toward the lower end of Figure 36 so that the end 298 of catch lever 168 rides on rib 299 of shaft 170. The plunger 194 (almost immediately after plunger 204) rides up said rise, thereby swinging catch lever 168 so that its lower end 298 engages in the annular notch 169, and tensioning spring 197 (Figure 36) sufficiently to move the clutch shaft 170 toward the right-hand side of Figures 33 and 37, thus disengages clutch members 172, 173 and stops the rotation of drum 177 at the end of its second half-revolution. It will be seen that the movement of plunger 204 by the first one of the end cams of said drum is of no consequence, because during said drum's first half-revolution whereby the tone arm is swung to operative position, the rod 201 has not been moved far enough toward the upper end of Figure 37 for any of its teeth to engage the catch 203; but that during the drum's second half-revolution this rod is moved (by the swinging of the tone arm) far enough toward the upper end of Figure 37 for one of its teeth to so engage. After the tone arm has been returned to initial or inoperative position and the drum 177 has almost reached the end of its second half-revolution, its pin 208 (Figure 31) strikes the cam surface 209 (Figures 34) of a lever 210 (fulcrumed at 211, and swings its other end to strike the adjustable lug 303 of the rod 76, thus sliding said rod toward the right-hand side of Figure 31 and moving lever 77 and arm 78 pivoted thereon to release its free end from the annular notch 81 of shaft 83. The clutch members 82, 88 now engage, so that the drum 91 again rotates to operate the selector arm's disk grippers to return the played record disk to the rack, as hereinbefore explained.

Throughout almost an entire revolution of the drum 91 the inner end of a plunger 304 rides on said drum's end face (Figures 23, 24). This plunger has thus been held in a position wherein it has moved arm 316 and rod 308 toward the right-hand side of Figure 24 against the pressure of a spring 324. This rod, pivotally connected at 310 with rod 309, has thus slid said rod 309 somewhat farther toward the right-hand side of Figures 19, 18, 33 than is shown in said views, i. e. far enough for its shoulder 311 to engage the projection 312 of arm 71. When however drum 91 has nearly completed an entire revolution, said plunger 304 falls at 305 into an arcuate groove cam 306 having a rise 307 (Figure 23). This falling movement from drop 305 permits arm 316 to swing toward the left-hand side of Figure 24, so that the expanding spring 324 urges rod 309 to the left-hand side of Figure 19 thus swinging arm 71 and catch lever 58 on the same shaft 70. The lower arm of said catch lever is thus swung toward the right-hand side of Figure 18 moving the lower end 313 of said lever from the upper surface 314 of arm 57 (pivotally mounted at 315) on which surface said end has been resting, this movement engaging said end 313 in said arm's notch 271, so that the spring 317 now urges arm 57 upwardly to its initial position seen in Figure 18 and moves the parts 56 and 49 to their initial positions shown in Figure 2 thus positioning the same for a subsequent operation of the machine. In the same movement of catch lever 58, its upper arm is swung toward the left-hand side of Figure 18 so that its shelf 318 may pass under the arm 59 (which operates the clutch fork 61) immediately said arm 59 is raised by the cam 321 on shaft 23 engaging (in said shaft's revolution) the lug 320 of the opposite extension 319 of said arm 59. The action of the plunger 304 and that of cam 321 are so timed as to effect the said result. Said shelf now supports arm 59 in its initial position ready for a subsequent operation of the machine (Figures 18 and 5), for the rising of arm 59 and the supporting of the same on shelf 318 of catch lever 58 causes the clutch members shown in Figures 9 and 8 to again engage and couple shafts 23, 24 in readiness for such subsequent operation.

It is to be noted that the rod 309 (Figure 19) (in the early portion of the machine's operation) is by spring 323 urged upwardly, disengaging its shoulder 311 from the projection 312, when this rod is slid to the right-hand side of Figure 19 by the riding of plunger 304 up the rise 307 of cam 306 (Figure 23); and during this movement of rod 309, the lower arm 325 of lever 326 (Figure 19) is swung by contact therewith until the lower end of said arm rises on and slides along the upper surface 327 of said rod, so that the pressure of spring 328 (stronger than spring 323) then urges this rod downwardly that its shoulder 311 may engage with projection 312 of arm 71; but when plunger 304 falls from the drop 305, the spring 324 (Figures 24, 23), in pushing this rod toward the left-hand side of Figure 19, slides it far enough for the lower end of lever 326 to again engage the lower surface 329 of said rod.

The shaft 330 of drum 91 (which makes one complete revolution for each cycle of the machine's operations) carries a cam 331 (Figure 25) which raises an arm 332 (pivotally mounted at 333) against the pressure of a spring 334. When this arm is raised by said cam, its extension 335 (Figure 2) connected at 336 to lever 13 lowers its left-hand arm so that the same may engage in a notch 241 of the link 12 (connected at 242 to the switch arm 14); and when said arm 332 falls from said cam under the pressure of spring 334 (on the completion of the machine's operations hereinbefore explained), it swings the switch arm upwardly and thus opens the electric circuit 245 and stops the motor. The mechanism is now at rest and its parts in position for the next cycle of operations to be initiated by inserting a coin into one of the chutes.

Figure 25:
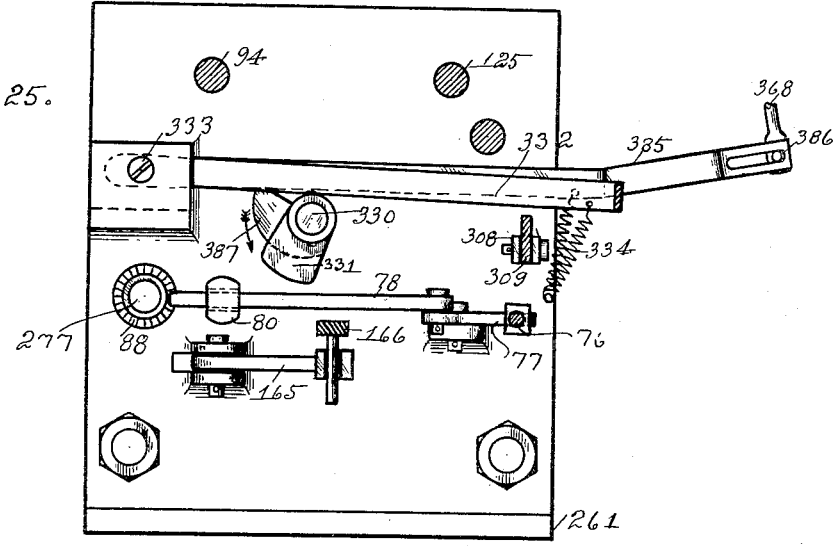
Figure 25 is a view of the plate on which said drum is rotatably mounted, showing mechanism carried by said plate for so operating the instrument's parts.

The needles carried by the tone arm are changed at predetermined intervals by the following mechanism (reference being had now particularly to Figures 41, 42, 43, 44 and 45):

The shaft 330 of drum 91 carries a worm 350 meshing with and driving a worm gear 351 on shaft 352 whose bevel gear 353 meshes with the gear 354 on shaft 355 to rotate the disk 356 and the cylinder 357 carried thereby. This cylinder is located at the bottom of a magazine 358 having preferably a glass front wall 359 detachably secured by a screw 360, and comprising a plurality of vertical compartments for the needles 361, and open at their bottoms to said cylinder. This cylinder has a longitudinal groove 362 adapted to receive only one of the needles when the cylinder in its turning movement causes said groove to register with the open bottom of any of said compartments containing the needles. Fingers 363 extending into the annular grooves 364 adjacent the cylinder's opposite ends engage the needle in groove 362 and lift the same out of said groove, the needle then sliding down a conduit 365 and, its rear end portion striking a projection 366 at one side of the conduit, is turned thereby point downwardly, and falls thus into the vertically extending well 367 in the upper end of a plunger 368. When the tone arm 185 is swung toward its retracted or rest position (Figure 41) the disk 356 has been turned to a position wherein the tooth 369 of an arm 370 (swingably mounted at 371) falls into the cam depression 372 of this disk, thereby permitting the link 373, lever arm 374 and shaft 375 to swing, by the pressure of spring 376 toward the right-hand side of Figure 43, thus turning the cam plate 377 carried by said shaft into the path of the arm 378 on the end of a screw 379 threaded in the end of the tone arm, the inner end of which screw by engaging the side of the needle in the socket 380 of the tone arm holds said needle in operative position. In this retracting swinging movement of the tone arm, the free end 381 of arm 378 rides up the incline 382 of said cam plate and turns and loosens said screw sufficiently to permit the spring 401 to eject the needle from its said socket. The retracting movement of the tone arm continuing, the free end of said arm is held on the surface 400 of the cam plate (by the pressure of a spring 383) in said position in which the screw is loosened, and when the tone arm is nearly retracted completely, the plunger 368 with the new needle in its well 367 is moved upwardly, thus inserting the new needle into the tone arm's socket 380; and thereupon the tone arm continuing its movement to completely retracted position, the end 381 of arm 378 falls from the end 384 of cam plate 377 and thereby permits the spring 383 to turn said arm and screw 379 reversely to hold the new needle in said socket 380. When the tooth 369 of arm 370 is cammed out of the depression 372 of disk 356, it rides on the side of said disk, thus holding the cam plate 377 out of the path of the arm 378. The said operative movement of the plunger 368 is effected by the arm 385 (to which this plunger is connected at 386) riding up a cam 387 carried by shaft 330 of drum 91 (Figure 25). The gear ratio of worm 350 and worm gear 351 determines the frequency with which the needles are changed, such frequency being desirable once in every twenty complete cycles of the machine's operations. A brush 389 is located in the path of the needle in the tone arm's swinging movement, for the purpose of removing lint and the like from the needle's point.

Equivalent parts operating to effect the same ends and in substantially the same manner (particularly mechanisms for communicating motion from certain parts to other parts and in ordered sequence) may be substituted for such parts and mechanisms illustrated and described without departing from the spirit and principles of this invention.

We claim:

1. In a sound-reproducing instrument of the character described: a horizontal turntable; a stationary rack adapted to hold in horizontally spaced relation a plurality of record disks in positions wherein their sides are disposed vertically and in the turntable's radial directions; an arm swingable concentrically with the turntable and carrying means for gripping a record disk in the rack, raising it therefrom, turning it to a sidewise horizontal position, depositing it in playing position on the table and releasing it.

2. In a sound-reproducing instrument of the character described: a horizontal turntable; a stationary rack adapted to hold in horizontally spaced relation a plurality of record disks in positions wherein their sides are disposed vertically and in the turntable's radial directions; an arm swingable concentrically with the turntable; a member carried by the arm turnably about a horizontal axis transverse the arm; record disk-gripping means carried by said member turnably about an axis transverse to the first-mentioned axis.

3. In a sound-reproducing instrument of the character described: a horizontal turntable; a stationary rack adapted to hold in horizontally spaced relation a plurality of record disks in positions wherein their sides are disposed vertically and in the turntable's radial directions; an arm swingable concentrically with the turntable and having a lug and carrying means for gripping a record disk in the rack, raising it therefrom, turning it to a sidewise horizontal position, depositing it in playing position on the turntable and releasing it; means for swinging the arm comprising a rotatable cylinder having an annular cam-groove in which the lug slidably engages.

4. In a sound-reproducing instrument of the character described: a horizontal turntable; a stationary rack adapted to hold in horizontally spaced relation a plurality of record disks in positions wherein their sides are disposed vertically and in the turntable's radial directions; an arm swingable concentrically with the turntable and having a lug; a member carried by the arm turnably about a horizontal axis transverse the arm; record disk-gripping means carried by said member turnably about an axis transverse the first-mentioned axis; means for swinging the arm comprising a rotatable cylinder having an annular cam-groove with oppositely-winding helical portions in which the lug slidably engages.

5. In a sound-reproducing instrument of the character described: a horizontal turntable; a stationary rack adapted to hold in horizontally spaced relation a plurality of record disks in positions wherein their sides are disposed vertically and in the turntable's radial directions; an arm swingable concentrically with the turntable; a member carried by the arm turnably about a horizontal axis transverse the arm; record disk-gripping means carried by said member turnably about an axis transverse the first-mentioned axis and having a gear; an element slidable transversely the arm and having toothed segments spaced from the opposite sides of the gear; a bar slidable transversely the arm to oppositely stopped positions; means for sliding said element by the bar into meshing position of either segment with the gear.

6. In a sound-reproducing instrument of the character described: a horizontal turntable; a stationary rack adapted to hold in horizontally spaced relation a plurality of record disks in positions wherein their sides are disposed vertically and in the turntable's radial directions; an arm swingable concentrically with the turntable; a member carried by the arm turnably about a horizontal axis transverse the arm; record disk-gripping means carried by said member turnably about an axis transverse the first-mentioned axis and comprising gripping jaws; a rod slidable in said member in the direction of the second-mentioned axis for operating the jaws; a rod slidable in the arm transversely to, and engaging, the first-mentioned rod to slide the same.

7. In a sound-reproducing instrument of the character described: a horizontal turntable; a stationary rack adapted to hold in horizontally spaced relation a plurality of record disks in positions wherein their sides are disposed vertically and in the turntable's radial directions; an arm swingable concentrically with the turntable; a member carried by the arm turnably about a horizontal axis transverse the arm; record disk-gripping means carried by said member turnably about an axis transverse the first-mentioned axis and comprising gripping jaws; a rod slidable in said member in the direction of the second-mentioned axis for operating the jaws, and having inclined rack teeth; a rod slidable in the arm transversely to the first-mentioned rod and having inclined rack teeth meshing with the rack teeth of the first-mentioned rod to slide the same.

8. In a sound-reproducing instrument of the character described: a horizontal turntable; a stationary rack adapted to hold in horizontally spaced relation a plurality of record disks in positions wherein their sides are disposed vertically and in the turntable's radial directions; an arm swingable concentrically with the turntable; a member carried by the arm turnably about a horizontal axis transverse the arm; record disk-gripping means carried by said member turnably about an axis transverse the first-mentioned axis and comprising gripping jaws; a rod slidable in said member in the direction of the second-mentioned axis for operating the jaws; a rod slidable in the arm transversely to, and engaging, the first-mentioned rod to slide the same, the first-mentioned rod comprising swivel-connected portions.

9. In a sound-reproducing instrument of the character described: a horizontal turntable; a stationary rack adapted to hold in horizontally spaced relation a plurality of record disks in positions wherein their sides are disposed vertically and in the turntable's radial directions; and arm swingable concentrically with the turntable; a member carried by the arm turnably about a horizontal axis transverse the arm; record disk-gripping means carried by said member turnably about an axis transverse the first-mentioned axis, and comprising gripping jaws and having a gear; an element slidable transversely the arm and having toothed segments spaced from the opposite sides of the gear; a bar slidable transversely the arm to oppositely stopped positions; means for sliding said element by the bar into meshing position of either segment with the gear; a rod slidable in said member in the direction of the second-mentioned axis for operating the jaws; a rod slidable in the arm transversely to, and engaging, the first-mentioned rod to slide the same.

10. In a sound-reproducing instrument of the character described: a horizontal turntable; a stationary rack adapted to hold in horizontally spaced relation a plurality of record disks in positions wherein their sides are disposed vertically and in the turntable's radial directions; an arm swingable concentrically with the turntable and carrying means for gripping a record disk in the rack, raising it therefrom, turning it to a sidewise horizontal position, depositing it in playng position on the table and releasing it; means for swinging the arm to positions registering with the respective record disks in the rack; means controlling said arm-swinging means comprising a plurality of coin-receiving chutes corresponding to said positions respectively.

11. In a sound-reproducing instrument of the character described: a horizontal turntable; a stationary rack adapted to hold in horizontally spaced relation a plurality of record disks in positions wherein their sides are disposed vertically and in the turntable's radial directions; an arm swingable concentrically with the turntable and carrying means for gripping a record disk in the rack, raising it therefrom, turning it to a sidewise horizontal position, depositing it in playing position on the table and releasing it; means for swinging the arm to positions registering with the respective record disks in the rack; means controlling said arm-swinging means comprising a rotatable drum having spaced projections and a plurality of coin chutes, the projections and the coin chutes corresponding to said positions respectively.

12. In a sound-reproducing instrument of the character described: a turntable; an arm swingable concentrically with the turntable and carrying means for gripping a record disk, turning it to a sidewise horizontal position, depositing it on the turntable in playing position and releasing it; means for rotating the turntable; means operable in connection with the last-mentioned means for operating the first-mentioned means, including a rotatable cylinder having toothed segments and cams and connections actuated by the segments and cams respectively.

13. In a sound reproducing instrument of the class described the combination of a horizontal turntable, a rack spaced outwardly from the turntable in its radial direction for holding a plurality of disk records in vertical edgewise position, record transfer mechanism comprising a pair of jaws for gripping the opposite sides of the marginal edge of a record, means for causing relative movement parallelly to the turntable between said transfer mechanism and said record rack so that selected records may be removed from said rack, means for projecting said jaws outwardly and closing them to gripping position, and means for moving said jaws bodily to transfer a record from said rack to said turntable.

14. In a sound reproducing instrument of the class described the combination of a horizontally disposed turntable, an arcuate rack in spaced relation to said turntable for holding a plurality of disk records in vertical edgewise spaced relation with their sides radially disposed with respect to said turntable, a selector arm horizontally swingable on an axis concentric with the axis of said turntable, a pair of gripping jaws carried by said selector arm, means for swinging said selector arm to register with records in said rack, means for moving said jaws relatively to each other to grip a record in said rack, and means for bodily moving said jaws to transfer a gripped record from said rack to said turntable.

15. In a sound reproducing instrument of the class described the combination of a horizontally disposed turntable, an arcuate rack in spaced relation to said turntable for holding a plurality of disk records in vertical edgewise spaced relation with their sides radially disposed with respect to said turntable, a selector arm horizontally swingable on an axis concentric with the axis of said turntable, a pair of gripping jaws carried by said selector arm, means for swinging said selector arm to register with records in said rack, means for simultaneously projecting said jaws outwardly and closing them to grip the opposite sides of the marginal edge of a record in said rack, and means for bodily moving said jaws to transfer a gripped record from said rack to said turntable.

16. In a sound reproducing instrument of the class described the combination of a horizontal turntable, a rack spaced outwardly from the turntable in its radial direction for holding a plurality of disk records in vertical edgewise position, record transfer mechanism comprising a pair of jaws for gripping the opposite sides of the marginal edge of a record, means for causing relative movement parallelly to the turntable between said transfer mechanism and said record rack so that selected records may be removed from said rack, means for projecting said jaws outwardly and closing them to gripping position, means for moving said jaws bodily to transfer a record from said rack to said turntable, and means for rotating said jaws during their bodily movement to turn the gripped record from a vertical to a horizontal plane.

17. A record transfer mechanism comprising a support, a body member journalled on said support and having an axial bore therethrough, a sleeve mounted on said body member with the axis thereof perpendicular to the axis of said body member, a pair of jaws pivoted on said sleeve, an axially extending shaft slidable in said sleeve for simultaneously projecting said jaws outwardly and closing them to grip a record, an axially extending plunger slidable in said body member bore for actuating said shaft, and means for rotating said body member to carry said jaws from a record engaging position to a record depositing position.

18. A record transfer mechanism comprising a support, a body member journalled on said support and having an axial bore therethrough, a sleeve rotatably mounted on said body member with the axis thereof perpendicular to the axis of said body member, a pair of jaws pivoted on said sleeve, an axially extending shaft slidable in said sleeve for simultaneously projecting said jaws outwardly and closing them to grip a record, an axially extending plunger slidable in said body member bore for actuating said shaft, means for rotating said body member to carry said jaws from a record engaging position to a record depositing position, gear teeth on said sleeve, and a toothed segment mounted on said support adapted to mesh with said sleeve gear teeth when said body member, sleeve and jaws are rotated to record depositing position for rotating said jaws on the axis of their supporting sleeve.

19. A record transfer mechanism comprising a support, a body member journalled on said support and having an axial bore therethrough, a sleeve rotatably mounted on said body member with the axis thereof perpendicular to the axis of said body member, a pair of jaws pivoted on said sleeve, an axially extending shaft slidable in said sleeve for simultaneously projecting said jaws outwardly and closing them to grip a record, an axially extending plunger slidable in said body member bore for actuating said shaft, means for rotating said body member to carry said jaws from a record engaging position to a record depositing position, gear teeth on said sleeve, a sleeve on said support slidable axially with respect to said body member, opposed toothed segments on said last-mentioned sleeve and means for sliding said last-mentioned sleeve to cause one or the other of said segments to mesh with said jaw carrying sleeve teeth when said body member, sleeve and jaws are rotated to record depositing position for rotating said jaws on the axis of their supporting sleeve.

20. In a sound reproducing instrument of the character described having a horizontal turntable and a rack for holding a plurality of disk records in spaced vertical edgewise position, mechanism for transferring a selected record from the rack to the turntable in playing position thereon and for returning it to its initial position in the rack, said mechanism comprising: an arm having a swinging movement parallelly with the turntable to a position registering with the selected record; a member having a turning movement on the arm about a horizontal axis transverse thereto for moving said record from the rack; record-gripping means having a turning movement on said member about an axis transverse to the first-mentioned axis for turning the record to horizontal position, and comprising record gripping jaws; means for thus moving the said parts of said mechanism to transfer the selected record to the turntable and for moving said parts reversely to return the record to its initial position.

21. In a sound reproducing instrument of the character described having a horizontal turntable and a rack for holding a plurality of double-face disk records in spaced vertical edgewise position, mechanism for transferring a selected record from the rack to the turntable and depositing it thereon in selected face playing position thereon and for returning it to its initial position in the rack, said mechanism comprising: an arm having a swinging movement parallelly with the turntable to a position registering with the selected record; a member having a turning movement on the arm about a horizontal axis transverse thereto for moving said record from the rack; record-gripping means having a turning movement on said member about an axis transverse to the first-mentioned axis in one direction for turning the record to horizontal position with a selected face in playing position and in the opposite direction for thus turning the record with its selected other face in playing position, and comprising record gripping jaws; means for moving the said parts of said mechanism to transfer the selected record with its selected face in playing position to the turntable and for moving said parts reversely to return the record to its initial position.

In testimony whereof we have hereunto set our hands at Grand Rapids, Michigan, this 5th day of July, 1927.

BERTRAM C. KENYON.
WILMUR W. BOA.
CLIFFORD H. GREEN.